(12) United States Patent
Park et al.

(10) Patent No.: US 11,777,077 B2
(45) Date of Patent: Oct. 3, 2023

(54) SILICON PARTICLES FOR BATTERY ELECTRODES

(71) Applicant: Enevate Corporation, Irvine, CA (US)

(72) Inventors: Benjamin Yong Park, Mission Viejo, CA (US); Jill R. Pestana, Huntington Beach, CA (US); Xiaohua Liu, Irvine, CA (US); Frederic Bonhomme, Foothill Ranch, CA (US)

(73) Assignee: ENEVATE CORPORATION, Irvine, CA (US)

(*) Notice: Subject to any disclaimer, the term of this patent is extended or adjusted under 35 U.S.C. 154(b) by 0 days.

(21) Appl. No.: 18/089,014

(22) Filed: Dec. 27, 2022

(65) Prior Publication Data
US 2023/0223512 A1 Jul. 13, 2023

Related U.S. Application Data

(63) Continuation of application No. 17/721,672, filed on Apr. 15, 2022, now Pat. No. 11,539,041, which is a
(Continued)

(51) Int. Cl.
*H01M 4/134* (2010.01)
*H01M 4/04* (2006.01)
(Continued)

(52) U.S. Cl.
CPC .......... *H01M 4/134* (2013.01); *C01B 33/021* (2013.01); *H01M 4/0471* (2013.01);
(Continued)

(58) Field of Classification Search
None
See application file for complete search history.

(56) References Cited

U.S. PATENT DOCUMENTS

| | | | |
|---|---|---|---|
| 3,990,098 A | 11/1976 | Mastrangelo |
| 4,435,444 A | 3/1984 | Goldberger |

(Continued)

FOREIGN PATENT DOCUMENTS

| | | |
|---|---|---|
| CN | 1667855 | 9/2005 |
| CN | 101095251 | 12/2007 |

(Continued)

OTHER PUBLICATIONS

International Search Report and Written Opinion for international application No. PCT/US2018/035486, dated Sep. 5, 2018 (18 pages).

(Continued)

*Primary Examiner* — Wyatt P McConnell
(74) *Attorney, Agent, or Firm* — McAndrews, Held & Malloy, Ltd.

(57) ABSTRACT

Silicon particles for use in an electrode in an electrochemical cell are provided. The silicon particles may have outer regions extending about 20 nm deep from the surfaces, the outer regions comprising an amount of aluminum such that a bulk measurement of the aluminum comprises at least about 0.01% by weight of the silicon particles. The bulk measurement of the aluminum may provide the amount of aluminum present at least in the outer regions.

20 Claims, 30 Drawing Sheets

Related U.S. Application Data continuation of application No. 16/899,862, filed on Jun. 12, 2020, now Pat. No. 11,309,536, which is a continuation of application No. 15/994,972, filed on May 31, 2018, now Pat. No. 10,707,478.

(60) Provisional application No. 62/596,071, filed on Dec. 7, 2017.

(51) Int. Cl.
  *H01M 4/62* (2006.01)
  *C01B 33/021* (2006.01)
  *H01M 4/38* (2006.01)
  *H01M 10/0525* (2010.01)
  *H01M 10/0562* (2010.01)
  *H01M 4/02* (2006.01)

(52) U.S. Cl.
  CPC ........... *H01M 4/386* (2013.01); *H01M 4/625* (2013.01); *H01M 10/0525* (2013.01); *H01M 10/0562* (2013.01); *H01M 2004/027* (2013.01); *H01M 2004/028* (2013.01)

(56) References Cited

U.S. PATENT DOCUMENTS

| | | |
|---|---|---|
| 4,526,610 A | 7/1985 | Miura |
| 5,429,866 A | 7/1995 | Dubrous |
| 5,625,606 A | 4/1997 | Wilson |
| 6,287,728 B1 | 9/2001 | Kajiura |
| 6,300,013 B1 | 10/2001 | Yamada |
| 6,413,672 B1 | 7/2002 | Suzuki |
| 6,432,579 B1 | 8/2002 | Tsuji |
| 6,436,576 B1 | 8/2002 | Hossain |
| 6,489,061 B1 | 12/2002 | Hossain |
| 6,497,829 B2 | 12/2002 | Golan |
| 6,589,696 B2 | 7/2003 | Magsubara |
| 6,743,549 B1 | 6/2004 | Doyle |
| 6,770,399 B2 | 8/2004 | Umeno |
| 6,946,223 B2 | 9/2005 | Kusumoto |
| 6,949,314 B1 | 9/2005 | Hossain |
| 7,037,581 B2 | 5/2006 | Aramata |
| 7,202,000 B2 | 4/2007 | Iriyama |
| 7,303,838 B2 | 12/2007 | Morita |
| 7,316,792 B2 | 1/2008 | Kosuzu |
| 7,615,314 B2 | 11/2009 | Kawakami |
| 7,670,970 B2 | 3/2010 | Ko |
| 8,158,285 B2 | 4/2012 | Im |
| 8,288,039 B2 | 10/2012 | Im |
| 8,372,549 B2 | 2/2013 | Im |
| 8,603,683 B2 | 12/2013 | Park |
| 8,709,653 B2 | 4/2014 | Lee |
| 9,178,208 B2 | 11/2015 | Park |
| 9,397,338 B2 | 7/2016 | Park |
| 9,553,303 B2 | 1/2017 | Park |
| 9,583,758 B2 | 2/2017 | Park |
| 9,608,262 B2 | 3/2017 | Aramata |
| 9,620,809 B2 | 4/2017 | Turon Teixidor |
| 9,647,259 B2 | 5/2017 | Park |
| 9,806,328 B2 | 10/2017 | Park |
| 9,941,509 B2 | 4/2018 | Park |
| 9,997,765 B2 | 6/2018 | Park |
| 10,103,378 B2 | 10/2018 | Park |
| 10,388,943 B2 | 8/2019 | Bonhomme |
| 10,431,808 B2 | 10/2019 | Park |
| 10,461,366 B1 | 10/2019 | Anderson |
| 10,516,155 B2 | 12/2019 | Park |
| 10,541,412 B2 | 1/2020 | Wang |
| 2002/0009646 A1 | 1/2002 | Matsubara |
| 2004/0137327 A1 | 7/2004 | Gross |
| 2005/0014072 A1 | 1/2005 | Yamaguchi |
| 2005/0031958 A1 | 2/2005 | Fujuoka |
| 2005/0089755 A1 | 4/2005 | Matsubara |
| 2005/0233213 A1 | 10/2005 | Lee |
| 2006/0003227 A1 | 1/2006 | Aramata |
| 2006/0035146 A1 | 2/2006 | Hayashi |
| 2006/0035149 A1 | 2/2006 | Nanba |
| 2006/0040182 A1 | 2/2006 | Kawakami |
| 2006/0051670 A1 | 3/2006 | Aramata |
| 2006/0051675 A1 | 3/2006 | Musha |
| 2006/0068287 A1 | 3/2006 | Morita |
| 2006/0127773 A1 | 6/2006 | Kawakami |
| 2006/0134516 A1 | 6/2006 | Im |
| 2006/0147799 A1 | 7/2006 | Hayashi |
| 2006/0147802 A1 | 7/2006 | Yasuda |
| 2006/0275668 A1 | 12/2006 | Peres |
| 2007/0054190 A1 | 3/2007 | Fukui |
| 2007/0072074 A1 | 3/2007 | Yamamoto |
| 2007/0072084 A1 | 3/2007 | Katsushi |
| 2007/0077490 A1 | 4/2007 | Kim |
| 2007/0154811 A1 | 7/2007 | Oh |
| 2007/0212610 A1 | 9/2007 | Sonobe |
| 2007/0243469 A1 | 10/2007 | Kim |
| 2007/0281216 A1 | 12/2007 | Petrat |
| 2008/0020282 A1 | 1/2008 | Kim |
| 2008/0102370 A1 | 5/2008 | Kashiwagi |
| 2008/0145757 A1 | 6/2008 | Mah |
| 2008/0145761 A1 | 6/2008 | Petrat |
| 2008/0160409 A1 | 7/2008 | Ishida |
| 2008/0280207 A1 | 11/2008 | Patoux |
| 2008/0286657 A1 | 11/2008 | Hasegawa |
| 2009/0004566 A1 | 1/2009 | Shirane |
| 2009/0023065 A1 | 1/2009 | Hwang |
| 2009/0029256 A1 | 1/2009 | Mah |
| 2009/0053589 A1 | 2/2009 | Obrovac |
| 2009/0087743 A1 | 4/2009 | Kim |
| 2009/0117467 A1 | 5/2009 | Zhamu |
| 2009/0117468 A1 | 5/2009 | Eom |
| 2009/0053608 A1 | 6/2009 | Choi |
| 2009/0181304 A1 | 7/2009 | Miyamoto |
| 2009/0186267 A1 | 7/2009 | Tiegs |
| 2009/0202911 A1 | 8/2009 | Fukuoka |
| 2009/0239151 A1 | 9/2009 | Nakanishi |
| 2009/0283875 A1 | 11/2009 | Garandet |
| 2009/0305135 A1 | 12/2009 | Shi |
| 2009/0317722 A1 | 12/2009 | Watanabe |
| 2010/0078599 A1 | 4/2010 | Kumta |
| 2010/0143798 A1 | 6/2010 | Zhamu |
| 2010/0255376 A1 | 10/2010 | Park |
| 2010/0266902 A1 | 10/2010 | Takano |
| 2010/0273058 A1 | 10/2010 | Lee |
| 2011/0020701 A1 | 1/2011 | Park |
| 2011/0033750 A1* | 2/2011 | Hosokawa ........... C01G 53/006 429/223 |
| 2011/0045360 A1 | 2/2011 | Deguchi |
| 2011/0135558 A1 | 6/2011 | Ma |
| 2011/0177393 A1 | 7/2011 | Park |
| 2011/0244333 A1 | 10/2011 | Kawada |
| 2012/0094178 A1 | 4/2012 | Loveridge |
| 2012/0202069 A1 | 8/2012 | Aoki |
| 2012/0210823 A1 | 8/2012 | Lee |
| 2014/0147751 A1 | 5/2014 | Yang |
| 2014/0166939 A1 | 6/2014 | Park |
| 2014/0170482 A1 | 6/2014 | Park |
| 2014/0170498 A1 | 6/2014 | Park |
| 2014/0234535 A1 | 8/2014 | Lee |
| 2014/0295290 A1 | 10/2014 | Park |
| 2015/0118567 A1 | 4/2015 | Chen |
| 2015/0325848 A1 | 11/2015 | Yamashita |
| 2017/0040598 A1 | 2/2017 | Wang |
| 2017/0133664 A1 | 5/2017 | Park |
| 2017/0133665 A1 | 5/2017 | Park |
| 2017/0133670 A1 | 5/2017 | Park |
| 2017/0155126 A1 | 6/2017 | Park |
| 2017/0170510 A1 | 6/2017 | Turon Teixidor |
| 2017/0279093 A1 | 9/2017 | Park |
| 2017/0365845 A1 | 12/2017 | Moon |
| 2018/0062154 A1 | 3/2018 | Park |
| 2018/0198114 A1 | 7/2018 | Bonhomme |
| 2018/0219211 A1 | 8/2018 | Park |
| 2018/0226642 A1 | 8/2018 | Wang |
| 2018/0287129 A1 | 10/2018 | Park |
| 2019/0178944 A1 | 6/2019 | Rango |

(56) References Cited

U.S. PATENT DOCUMENTS

| | | | |
|---|---|---|---|
| 2019/0181431 A1 | 6/2019 | Canton |
| 2019/0181434 A1 | 6/2019 | Lee |
| 2019/0181440 A1 | 6/2019 | Park |
| 2019/0181441 A1 | 6/2019 | Ji |
| 2019/0181491 A1 | 6/2019 | Park |
| 2019/0181492 A1 | 6/2019 | Liu |
| 2019/0181500 A1 | 6/2019 | Ji |
| 2019/0181501 A1 | 6/2019 | Ji |
| 2019/0181502 A1 | 6/2019 | Ji |
| 2019/0190069 A1 | 6/2019 | Ji |
| 2019/0190070 A1 | 6/2019 | Ji |
| 2019/0355966 A1 | 11/2019 | Kamath |
| 2019/0372088 A1 | 12/2019 | Bonhomme |
| 2020/0014068 A1 | 1/2020 | Anderson |

FOREIGN PATENT DOCUMENTS

| | | |
|---|---|---|
| CN | 102834955 | 12/2012 |
| EP | 1 054 462 | 11/2000 |
| EP | 1 363 341 | 11/2003 |
| EP | 1 722 429 | 11/2006 |
| EP | 2 113 955 | 11/2009 |
| JP | 2000-173667 | 6/2000 |
| JP | 2000-272911 | 10/2000 |
| JP | 2001-006682 | 1/2001 |
| JP | 2001-160392 | 6/2001 |
| JP | 2003-165175 | 6/2003 |
| JP | 2004-03405 | 4/2004 |
| JP | 2005-285382 | 10/2005 |
| JP | 2007-073334 | 3/2007 |
| JP | 2007-123141 | 5/2007 |
| JP | 2007-165061 | 6/2007 |
| JP | 2008-153006 | 7/2008 |
| JP | 2009-026760 | 2/2009 |
| JP | 2009-037842 | 2/2009 |
| KR | 2001-0081928 | 8/2001 |
| KR | 2009-0011888 | 2/2009 |
| KR | 2009-0109225 | 10/2009 |
| WO | 98/028804 | 7/1998 |
| WO | 2011/088472 | 7/2011 |
| WO | 2012/126338 | 9/2012 |
| WO | 2014/007161 | 1/2014 |
| WO | 2014/158729 | 10/2014 |
| WO | 2017/027263 | 2/2017 |
| WO | 2019/112643 | 6/2019 |

OTHER PUBLICATIONS

Na et al., "Effect of the Average Particle Size and the Surface Oxidation Layer of Silicon on the Colloidal Silica Particle Through Direct Oxidation", Materials Science and Engineering B 163, 2009, pp. 87-87.
Studart et al., "Processing Routes to Macroporous Ceramics: A Review", Journal of the American Ceramic Society, 2006, vol. 89, No. 6, pp. 171-1789.
Zhou et al., "Kinetics Model for the Growth of Silicon Carbide by the Reaction of Liquid Silicon with Carbon", Journal of the American Ceramic Society, 1995, vo. 78, No. 9, pp. 2456-2462.
Chabal, Y.J., "Hydride Formation on the Si(100):H2O Surface", Physical Review B, vol. 29, No. 6, Mar. 15, 1984, pp. 3677-3680.
Ciftja et al., "Wettability of Silicon with Refractory Materials: A Review", Norwegian University of Science and Technology, Feb. 2008, 37 pages.
Krüss, GmbH, Technical Note on "Washburn measurements on porous solid: Wettability studies for porous solids including powders and fibrous materials", Jan. 1996, 14 pages. https://www.kruss-scientific.com/fileadmin/user_upload/website/literature/kruss-tn302-en.pdf.
Mukasyan, A.S., "Combustion Synthesis of Silicon Carbide", Properties and Applications of Silicon Carbide, ed. Prof. R. Gerhardt, InTech, 2011, pp. 389-410.
International Preliminary Report on Patentability for International Application No. PCT/US2018/035486, dated Jan. 22, 2020 (22 pages).
Bogart et al., "High Capacity Lithium Ion Battery Anodes of Silicon and Germanium", Current Opinion in Chemical Engineering, 2013, vol. 2, pp. 1-8.
Choi et al., "Effect of Fluoroethylene Carbonate Additive on Interfacial Properties of Silicon Thin-Film Electrode", Journal of Power Sources, 2006, vol. 161, pp. 1254-1259.
Choi et al., "Enhanced Electrochemical Properties of a Si-based Anode Using an Electrochemically Active Polyamide Imide Binder", Journal of Power Sources, 2008, vol. 177, pp. 590-594.
Datta, et al., "Silicon, Graphite and Resin Based Hard Carbon Nanocomposite Anodes for Lithium Ion Batteries," Journal of Power Sources, Feb. 10, 2007, vol. 165, No. 1, pp. 368-378.
Gilman et al., "Chapter 11 Thermal Decomposition Chemistry of Poly(vinyl alcohol)," in Fire and Polymers II Materials and Test for Hazard Prevention, American Chemical Society, ACS Symposium Series 599, Aug. 21-26, 1994, Washington, DC, pp. 161,185.
Hsu, G., "Fines in Fluidized Bed Silane Pyrolysis", Journal of the Electrochemical Society, Mar. 1984, vol. 131, No. 3, pp. 660-663.
Hu et al., "Superior Storage Performance of a Si@Diox/C Nanocomposite as Anode Material for Lithium-Ion Batteries" Angewandte Chemie International Edition, Feb. 15, 2008, vol. 47, No. 9, pp. 1645-1659.
Ji et al., "Electrospun Carbon Nanofibers Containing Silicon Particles as a Energy-Storage Medium", Carbon, Nov. 2009, vol. 47, No. 14, pp. 3219-3226.
Lee et al., "Graphene-Silicon Composite for Li-Ion Battery Anodes", http://apps.alche.org/proceedings/Abstracts.aspx? PaperID= 162914, dated Sep. 11, 2009 [Retrieved Jun. 23, 2011].
Lee, et al., "Silicon Nanoparticles-Graphene Paper Composites for Li Ion Battery Anodes", Chemical Communications, 2010, vol. 46, No. 12, pp. 2025-2027.
Lin et al., "High Performance Silicon Nanoparticle Anode in Fluroethylene Carbonate-Based Electrolyte for Li-Ion Batteries", Chemical Communications, 2012. vol. 48, pp. 7268-7270.
Ma et al., "Si-Based Anode Materials for Li-Ion Batteries: A Mini Review", Nano-Micro Letters, 2014, vol. 6, No. 4, pp. 347-358.
Nakai et al., "Investigation of the Solid Electrolyte Interphase Formed by Fluoroethylene Carbonate on Si Electrodes", Journal of the Electrochemical Society, 2011, vol. 158, No. 7, pp. A798-A801.
"Pitch-based carbon fiber", Wikipedia, https://en.wikipedia.org/wiki-Pitch-based_carbon_fiber, edited Nov. 7, 2017 (3 pages).
Seo et al., Stacking Faults in β-SI Formed During Carbothermal Reduction of SiO2, Journal of the American Ceramic Society, 1996, vol. 79, No. 7, pp. 1777-1782.
Su et al., Silicon-Based Nanomaterials for Lithium-Ion Batteries: A Review, Advanced Energy Materials, 2014, vol. 4, pp. 1-23.
Sun et al., "Formation of Silicon Carbide Nanotubes and Nanowires via Reaction of Silicon (from Disproportionation of Silicon Monoxide) with Carbon Nanotubes", Journal of the American Ceramic Society, 2002, vol. 124, No. 48, pp. 14464-14471.
Wolf, H., et al., "Carbon-Riber-Silicon Nanocomposites for Lithium-Ion Battery Anodes by Microwave Plasma Chemical Vapor Deposition", Journal of Power Sources, May 1, 2009, vol. 190, No. 1, pp. 157-161.
Zhang, Sheng Shui, "A Review on Electrolyte Additives for Lithium-Ion Batteries", Journal of Power Sources, 2006, vol. 162, pp. 1379-1394.
Zhang. Wei-Jun, "A Review of the ELectrochemical Performance of Alloy Anodes for Lithium-Ion Batteries", Journal of Power Sources, 2011, vol. 196, pp. 13-24.
Zhang et al., "Heterostructures of Single-Walled Carbon Nanotubes and Carbide Nanorods", Science, Sep. 10, 1999, vol. 285, pp. 1719-1722.
International Search Report and Written Opinion for International Application No. PCT/US2011/021585, dated Jul. 26, 2011 (15 pages).
Written Opinion, for International Application No. PCT/2011/021585, dated May 3, 2012 (8 pages).

(56) References Cited

OTHER PUBLICATIONS

International Preliminary Report on Patentability for International Application No. PCT/US2011/021585, dated Jun. 28, 2012 (14 pages).
International Search Report and Written Opinion for International Application No. PCT/US2014/019683, dated May 30, 2014 (13 pages).
International Preliminary Report on Patentability and Written Opinion for International Application No. PCT/US2014/019683, dated Sep. 24, 2015 (9 pages).
International Search Report and Written Opinion for International Application No. PCT/US2016/045184, dated Oct. 7, 2016 (11 pages).
International Preliminary Report on Patentability and Written Opinion for International Application PCT/US2016/056184, dated Feb. 22, 2018 (8 pages).

* cited by examiner

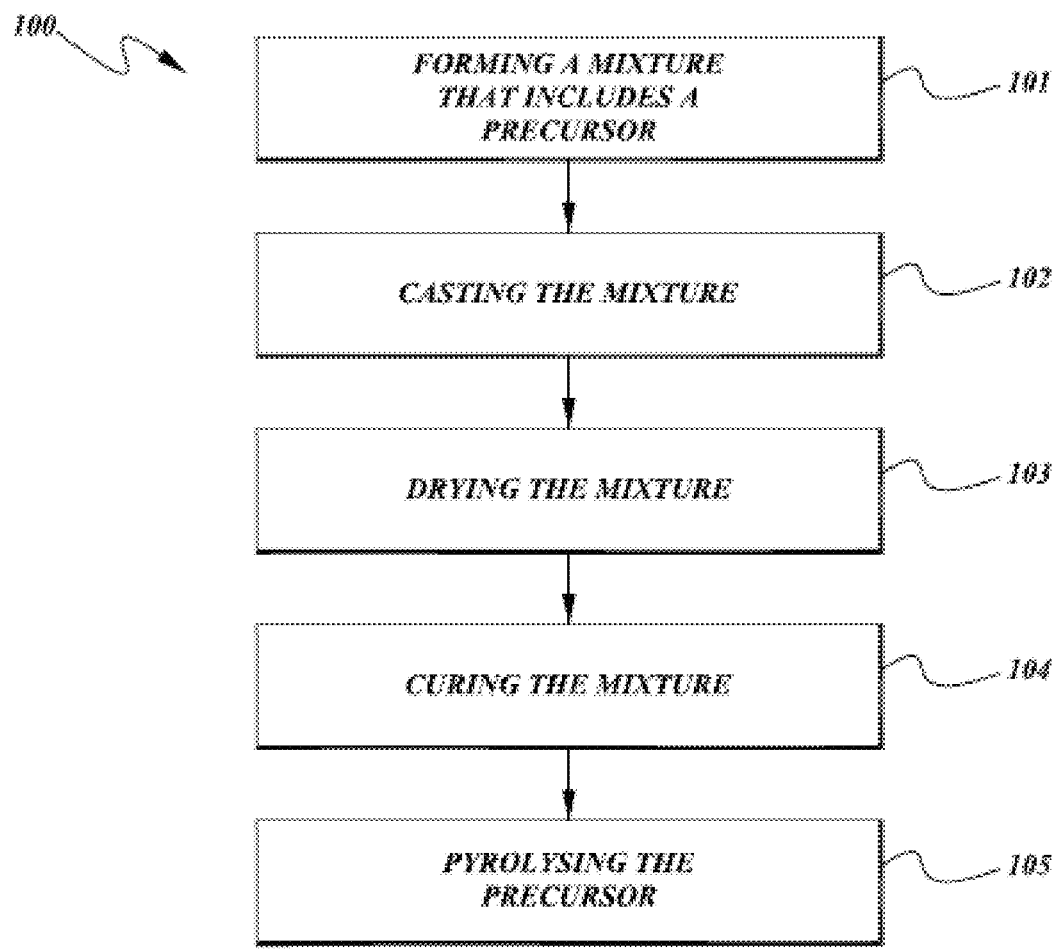
FIG. IA

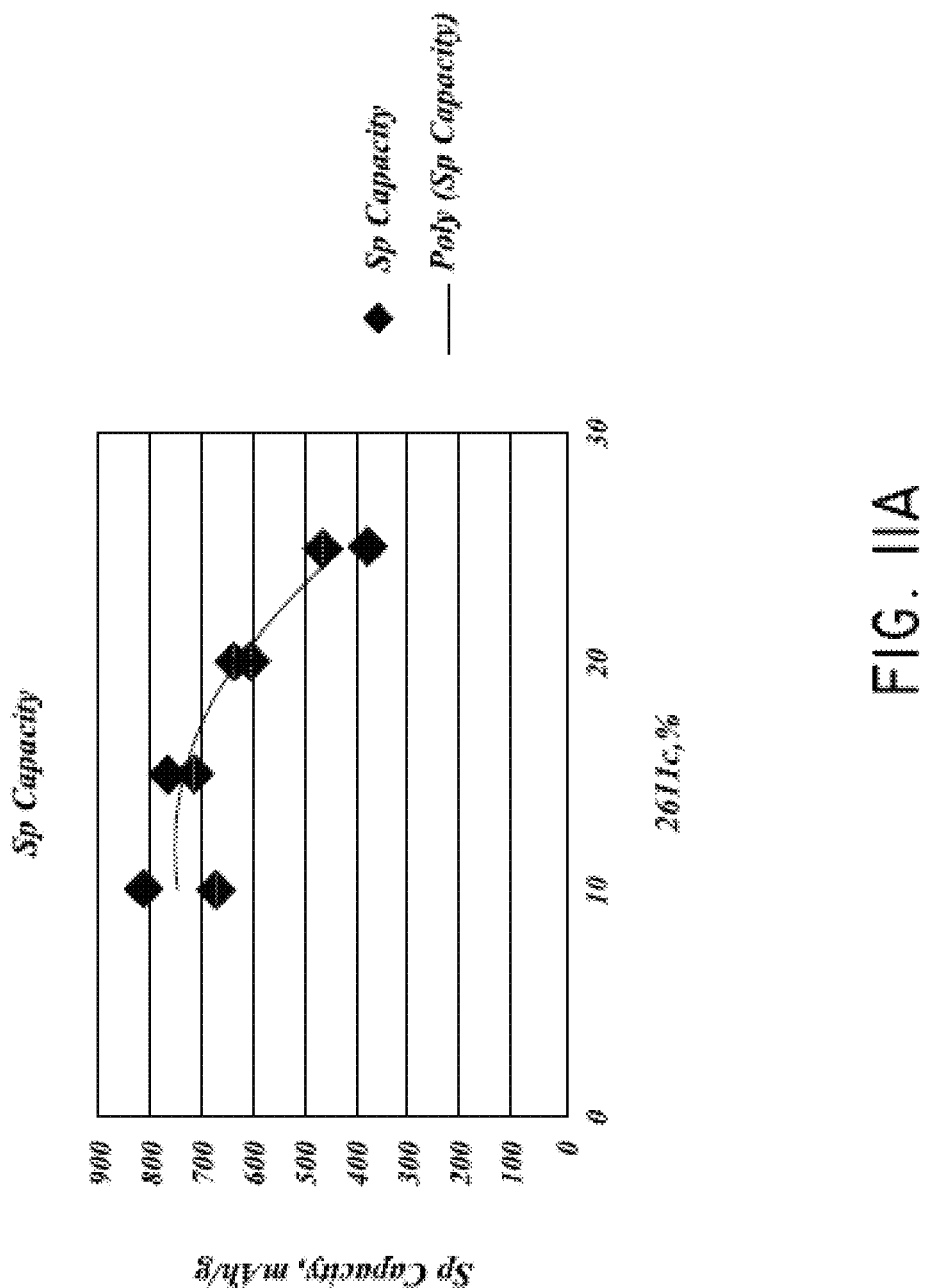
FIG. IIA

| | |
|---|---|
| *Major* | *Si* |
| *Elements looked for but not detected (<0.001)* | *Ag* |
| | *Al* |
| | *B* |
| | *Be* |
| | *Bi* |
| | *Cd* |
| | *Co* |
| | *Cr* |
| | *Cu* |
| | *Fe* |
| | *Ge* |
| | *In* |
| | *Mg* |
| | *Mn* |
| | *Mo* |
| | *Nb* |
| | *Ni* |
| | *Pb* |
| | *Sb* |
| | *Sn* |
| | *Sr* |
| | *Ti* |
| | *V* |
| | *W* |
| | *Zn* |
| | *Zr* |
| *Elements looked for but not detected (<0.005)* | *As* |
| | *Ca* |

FIG. 26

SILICON PARTICLES FOR BATTERY ELECTRODES

CROSS-REFERENCE TO RELATED APPLICATIONS

This application is a continuation of U.S. application Ser. No. 17/721,672, filed Apr. 15, 2022, which is a continuation of U.S. application Ser. No. 16/899,862, filed Jun. 12, 2020, which is a continuation of U.S. application Ser. No. 15/994,972, filed May 31, 2018, which claims the benefit of U.S. Provisional Application No. 62/596,071, filed Dec. 7, 2017, the entirety of each of the above referenced applications is hereby incorporated by reference.

BACKGROUND

Field

The present application relates generally to silicon particles. In particular, the present application relates to silicon particles and composite materials including silicon particles for use in battery electrodes.

Description of the Related Art

A lithium ion battery typically includes a separator and/or electrolyte between an anode and a cathode. In one class of batteries, the separator, cathode and anode materials are individually formed into sheets or films. Sheets of the cathode, separator and anode are subsequently stacked or rolled with the separator separating the cathode and anode (e.g., electrodes) to form the battery. Typical electrodes include electro-chemically active material layers on electrically conductive metals (e.g., aluminum and copper). Films can be rolled or cut into pieces which are then layered into stacks. The stacks are of alternating electro-chemically active materials with the separator between them.

SUMMARY

In certain embodiments, silicon particles are provided. The silicon particles can be used in an electrode in an electrochemical cell. The silicon particles can have surfaces providing an average contact angle less than about 87.2°. For example, the average contact angle can be from about 82° to about 87.1°. The silicon particles can also have outer regions extending about 20 nm deep from the surfaces. The outer regions can include an amount of aluminum such that a bulk measurement of the aluminum comprises at least about 0.01% by weight of the silicon particles. For example, the bulk measurement of the aluminum can comprise from about 0.01% to about 1% by weight of the silicon particles. In some instances, the bulk measurement of the aluminum can comprise at least about 0.05% by weight of the silicon particles. For example, the bulk measurement of the aluminum can comprise from about 0.05% to about 1% by weight of the silicon particles. In some instances, the bulk measurement of the aluminum can comprise at least about 0.1% by weight of the silicon particles. For example, the bulk measurement of the aluminum can comprise from about 0.1% to about 1% by weight of the silicon particles. As another example, the bulk measurement of the aluminum can comprise from about 0.1% to about 0.6% by weight of the silicon particles. The outer regions in some silicon particles can comprise aluminum oxide and/or aluminum silicide. In certain embodiments, electrodes for use in an electrochemical cell comprising various embodiments of the silicon particles are also provided.

In various embodiments, composite material films are provided. The composite material film can include greater than 0% and less than about 99% by weight of silicon particles. For example, the composite material film can include the silicon particles at 50% to 99% by weight of the composite material film. As another example, the composite material film can include the silicon particles at 70% to 99% by weight of the composite material film. The silicon particles can have surface coatings comprising silicon carbide or a mixture of carbon and silicon carbide. The silicon particles can have regions extending about 20 nm deep from the surface coatings. The regions can include an amount of aluminum such that a bulk measurement of the aluminum comprises at least about 0.01% by weight of the silicon particles. In some instances, the bulk measurement of the aluminum can comprise at least about 0.1% by weight of the silicon particles. For example, the bulk measurement of the aluminum can comprise from about 0.1% to about 1% by weight of the silicon particles. As another example, the bulk measurement of the aluminum can comprise from about 0.1% to about 0.6% by weight of the silicon particles. The regions in some silicon particles can comprise aluminum oxide and/or aluminum silicide. The composite material film can also include greater than 0% and less than about 90% by weight of one or more types of carbon phases. At least one of the one or more types of carbon phases can be a substantially continuous phase. In some instances, at least one of the one or more types of carbon phases that is a substantially continuous phase can be electrochemically active and electrically conductive.

In some embodiments of the composite material film, an average particle size of the silicon particles can be from about 0.1 µm to about 40 µm. For example, an average particle size of the silicon particles can be from about 1 µm to about 20 µm. In some instances, the silicon particles can be from about 90% pure silicon to about 99% pure silicon. The surface coatings can include silicon monoxide (SiO), silicon dioxide ($SiO_2$), or silicon oxide ($SiO_x$). The surface coatings can be a substantially continuous layer. The composite material film can be self-supported. In various embodiments, lithium-ion battery electrodes comprising the composite material film are also provided.

In certain embodiments, methods of forming a composite material are provided. A method can include providing a mixture comprising a precursor and silicon particles. The method can also include pyrolyzing the precursor to convert the precursor into one or more types of carbon phases. The method can further include forming silicon carbide on surfaces of silicon particles. The silicon particles can have regions extending about 20 nm deep from the surfaces. The regions can include an amount of aluminum such that a bulk measurement of the aluminum comprises at least about 0.01% by weight of the silicon particles. In some instances, the bulk measurement of the aluminum can comprise at least about 0.1% by weight of the silicon particles. For example, the bulk measurement of the aluminum can comprise from about 0.1% to about 1% by weight of the silicon particles. As another example, the bulk measurement of the aluminum can comprise from about 0.1% to about 0.6% by weight of the silicon particles. In some instances, the silicon particles can comprise aluminum oxide and/or aluminum silicide.

In some embodiments of the method, the surfaces of the silicon particles can provide an average contact angle less than about 87.2°. For example, the average contact angle can be from about 82° to about 87.1°. In some instances of the method, providing the mixture can include providing moisture treated silicon particles. For example, the moisture treated silicon particles can comprise silicon particles treated with water, silicon particles treated with alcohol, liquid-boiled silicon particles, liquid-decanted silicon particles, steamed silicon particles, silicon particles heat treated with moisture, and/or silicon particles treated with an oxidizing reagent. The oxidizing reagent can include potassium hydroxide and/or hydrogen peroxide. In some instances of the method, providing the mixture can include providing moisture to the precursor. The precursor can comprise a polymer and a solvent. Providing moisture to the precursor can include providing moisture to the polymer and/or providing moisture to the solvent. The solvent can include N-methyl-pyrrolidone (NMP) and/or water. The precursor can include a water-soluble polymer.

In some embodiments of the method, the silicon carbide and/or one of the one or more types of carbon phases can form substantially continuous layers on the silicon particles. Forming silicon carbide can include reacting one of the one or more types of carbon phases with the silicon particles. Reacting one of the one or more types of carbon phases with the silicon particles can include reacting one or more types of carbon phases with native silicon oxide layers of the silicon particles. Pyrolyzing the precursor can include heating the mixture to a temperature of about 500° C. to about 1300° C. For example, pyrolyzing the precursor can include heating the mixture to a temperature of about 800° C. to about 1200° C. As another example, pyrolyzing the precursor can include heating the mixture to a temperature of about 1175° C. In some instances, pyrolyzing can comprise providing moisture to the mixture.

In some embodiments of the method, the method can comprise casting the mixture on a substrate, drying the mixture to form a film, removing the film from the substrate, and placing the film in a hot press. Casting the mixture can include providing moisture to the mixture. Drying the mixture can include heat treating the mixture with moisture. Placing the film in a hot press can include providing moisture to the film.

BRIEF DESCRIPTION OF THE DRAWINGS

FIG. 1A illustrates an embodiment of a method of forming a composite material that includes forming a mixture that includes a precursor, casting the mixture, drying the mixture, curing the mixture, and pyrolyzing the precursor;

FIGS. 11A and 11B are plots of the reversible and irreversible capacity as a function of the various weight percentage of PI derived carbon from 2611c and graphite particles for a fixed percentage of 20 wt. % Si;

FIG. 26 is a chemical analysis of the sample silicon particles;

DETAILED DESCRIPTION

Figure 1B:
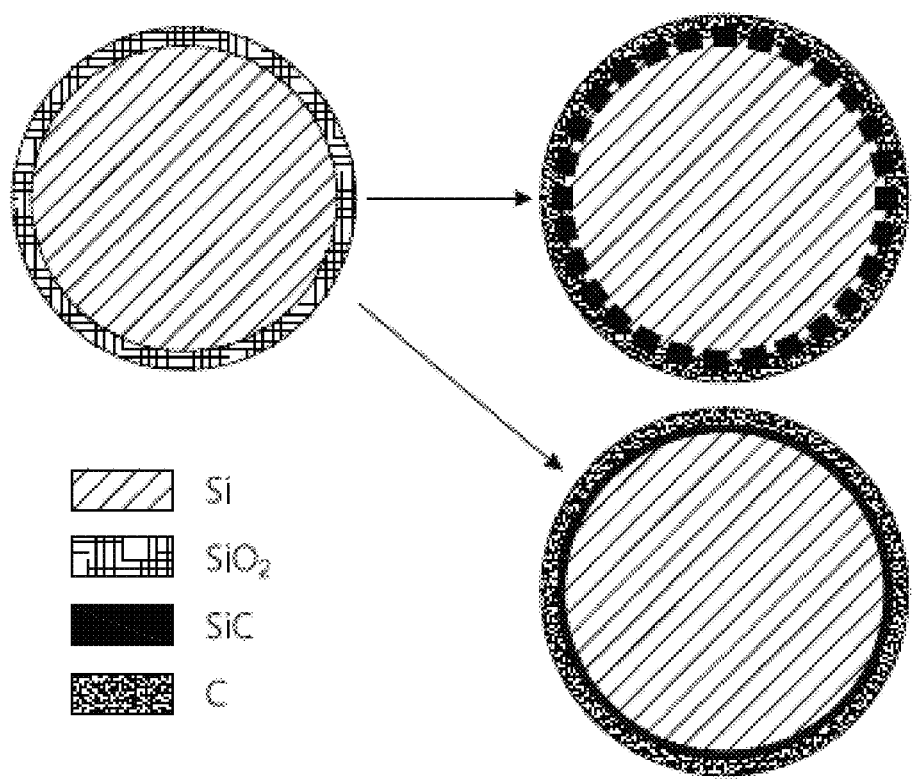
FIG. 1B is a schematic illustration of the formation of silicon carbide on a silicon particle.

This application describes certain embodiments of silicon material that may be used as electrochemically active material in electrodes (e.g., anodes and cathodes) in electrochemical cells. Silicon can be a potentially high energy per unit volume host material, such as for lithium ion batteries. For example, silicon has a high theoretical capacity and can increase the energy density of lithium ion batteries compared with lithium ion batteries using other active materials such as graphite. However, silicon can swell in excess of 300% upon lithium insertion. Accordingly, batteries with silicon anodes may exhibit more rapid capacity loss upon cycling compared with batteries with graphite anodes. The repeat expansion and contraction of silicon particles during charge and discharge can lead to mechanical failure of the anode during cycling. Mechanical failure can expose new surfaces of silicon which can react with the electrolyte, irreversibly incorporating lithium ions in the solid electrolyte interface/interphase (SEI), and leading to capacity loss. Certain embodiments described herein can include silicon material with a modified surface, leading to improved cycling performance. For example, some embodiments can provide an SEI with increased stability (e.g., a substantially stable SEI and/or a stable SEI in some instances) to improve the capacity retention and reduce (e.g., and/or prevent in some instances) fast fading.

Typical carbon anode electrodes include a current collector such as a copper sheet. Carbon is deposited onto the collector along with an inactive binder material. Carbon is often used because it has excellent electrochemical properties and is also electrically conductive. If the current collector layer (e.g., copper layer) was removed, the carbon would likely be unable to mechanically support itself. Therefore, conventional electrodes require a support structure such as the collector to be able to function as an electrode. The electrode (e.g., anode or cathode) compositions described in this application can produce electrodes that are self-supported. The need for a metal foil current collector is eliminated or minimized because conductive carbonized polymer is used for current collection in the anode structure as well as for mechanical support. In typical applications for the mobile industry, a metal current collector is typically added to ensure sufficient rate performance. The carbonized polymer can form a substantially continuous conductive carbon phase in the entire electrode as opposed to particulate carbon suspended in a non-conductive binder in one class of conventional lithium-ion battery electrodes. Advantages of a carbon composite blend that utilizes a carbonized polymer can include, for example, 1) higher capacity, 2) enhanced overcharge/discharge protection, 3) lower irreversible capacity due to the elimination (or minimization) of metal foil current collectors, and 4) potential cost savings due to simpler manufacturing.

Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Several types of silicon materials, e.g., silicon nanopowders, silicon nanofibers, porous silicon, and ball-milled silicon, have also been reported as viable candidates as active materials for the negative or positive electrode. Small particle sizes (for example, sizes in the nanometer range) generally can increase cycle life performance. They also can display very high irreversible capacity. However, small particle sizes also can result in very low volumetric energy density (for example, for the overall cell stack) due to the difficulty of packing the active material. Larger particle sizes, (for example, sizes in the micrometer or micron range) generally can result in higher density anode material. However, the expansion of the silicon active material can result in poor cycle life due to particle cracking. For example, silicon can swell in excess of 300% upon lithium insertion. Because of this expansion, anodes including silicon should be allowed to expand while maintaining electrical contact between the silicon particles.

As described herein and in U.S. patent application Ser. No. 13/008,800 (U.S. Pat. No. 9,178,208) and Ser. No. 13/601,976 (U.S. Patent Application Publication No. 2014/0170498), entitled "Composite Materials for Electrochemical Storage" and "Silicon Particles for Battery Electrodes," respectively, the entireties of which are hereby incorporated by reference, certain embodiments utilize a method of creating monolithic, self-supported anodes using a carbonized polymer. Because the polymer is converted into an electrically conductive and electrochemically active matrix, the resulting electrode is conductive enough that a metal foil or mesh current collector can be omitted or minimized. The converted polymer also acts as an expansion buffer for silicon particles during cycling so that a high cycle life can be achieved. In certain embodiments, the resulting electrode is an electrode that is comprised substantially of active material. In further embodiments, the resulting electrode is substantially active material. The electrodes can have a high energy density of between about 500 mAh/g to about 3500 mAh/g that can be due to, for example, 1) the use of silicon, 2) elimination or substantial reduction of metal current collectors, and 3) being comprised entirely or substantially entirely of active material.

As described in U.S. patent application Ser. No. 14/821,586 (U.S. Patent Application Publication No. 2017/0040598), entitled "Surface Modification of Silicon Particles for Electrochemical Storage," the entirety of which is hereby incorporated by reference, in certain embodiments, carbonized polymer may react with a native silicon oxide surface layer on the silicon particles. In some embodiments, the surface of the particles is modified to form a surface coating thereon, which may further act as an expansion buffer for silicon particles during cycling. The surface coating may include silicon carbide.

The composite materials described herein can be used as an anode in most conventional lithium ion batteries; they may also be used as the cathode in some electrochemical couples with additional additives. The composite materials can also be used in either secondary batteries (e.g., rechargeable) or primary batteries (e.g., non-rechargeable). In certain embodiments, the composite materials are self-supported structures. In further embodiments, the composite materials are self-supported monolithic structures. For example, a collector may be included in the electrode comprised of the composite material. In certain embodiments, the composite material can be used to form carbon structures discussed in U.S. patent application Ser. No. 12/838,368 (U.S. Patent Application Publication No. 2011/0020701), entitled "Carbon Electrode Structures for Batteries," the entirety of which is hereby incorporated by reference. Furthermore, the composite materials described herein can be, for example, silicon composite materials, carbon composite materials, and/or silicon-carbon composite materials. As described in U.S. patent application Ser. No. 13/799,405 (U.S. Pat. No. 9,553,303), entitled "Silicon Particles for Battery Electrodes," the entirety of which is hereby incorporated by reference, certain embodiments can further include composite materials including micron-sized silicon particles. For example, in some embodiments, the micron-sized silicon particles have nanometer-sized features on the surface. Silicon particles with such a geometry may have the benefits of both micron-sized silicon particles (e.g., high energy density) and nanometer-sized silicon particles (e.g., good cycling behavior). As used herein, the term "silicon particles" in general can include micron-sized silicon particles with or without nanometer-sized features.

FIG. 1A illustrates one embodiment of a method of forming a composite material 100. For example, the method of forming a composite material can include forming a mixture including a precursor, block 101. The method can further include pyrolyzing the precursor to convert the precursor to a carbon phase. The precursor mixture may include carbon additives such as graphite active material, chopped or milled carbon fiber, carbon nanofibers, carbon nanotubes, and/or other carbons. After the precursor is pyrolyzed, the resulting carbon material can be a self-supporting monolithic structure. In certain embodiments, one or more materials are added to the mixture to form a composite material. For example, silicon particles can be added to the mixture. The carbonized precursor results in an electrochemically active structure that holds the composite material together. For example, the carbonized precursor can be a substantially continuous phase. The silicon particles, including micron-sized silicon particles with or without nanometer-sized features, may be distributed throughout the composite material. Advantageously, the carbonized precursor can be a structural material as well as an electrochemically active and electrically conductive material. In certain embodiments, material particles added to the mixture are homogenously or substantially homogeneously distributed throughout the composite material to form a homogeneous or substantially homogeneous composite.

The mixture can include a variety of different components. The mixture can include one or more precursors. In certain embodiments, the precursor is a hydrocarbon compound. For example, the precursor can include polyamide-imide, polyamic acid, polyimide, etc. Other precursors can include phenolic resins, epoxy resins, and/or other polymers. The mixture can further include a solvent. For example, the solvent can be N-methyl-pyrrolidone (NMP). Other possible solvents include acetone, diethyl ether, gamma butyrolactone, isopropanol, dimethyl carbonate, ethyl carbonate, dimethoxyethane, ethanol, methanol, etc. Examples of precursor and solvent solutions include PI-2611 (HD Microsystems), PI-5878G (HD Microsystems) and VTEC PI-1388 (RBI, Inc.). PI-2611 is comprised of >60% n-methyl-2-pyrrolidone and 10-30% s-biphenyldianhydride/p-phenylenediamine. PI-5878G is comprised of >60% n-methylpyrrolidone, 10-30% polyamic acid of pyromellitic dianhydride/oxydianiline, 10-30% aromatic hydrocarbon (petroleum distillate) including 5-10% 1,2,4-trimethylbenzene. In certain embodiments, the amount of precursor in the solvent is about 10 wt. % to about 30 wt. %. Additional materials can also be included in the mixture. For example, as previously discussed, silicon particles or carbon particles including graphite active material, chopped or milled carbon fiber, carbon nanofibers, carbon nanotubes, and other conductive carbons can be added to the mixture. In addition, the mixture can be mixed to homogenize the mixture.

In certain embodiments, the mixture is cast on a substrate, block 102 in FIG. 1A. In some embodiments, casting includes using a gap extrusion, tape casting, or a blade casting technique. The blade casting technique can include applying a coating to the substrate by using a flat surface (e.g., blade) which is controlled to be a certain distance above the substrate. A liquid or slurry can be applied to the substrate, and the blade can be passed over the liquid to spread the liquid over the substrate. The thickness of the coating can be controlled by the gap between the blade and the substrate since the liquid passes through the gap. As the liquid passes through the gap, excess liquid can also be scraped off. For example, the mixture can be cast on a substrate comprising a polymer sheet, a polymer roll, and/or foils or rolls made of glass or metal. The mixture can then be dried to remove the solvent, block 103. For example, a polyamic acid and NMP solution can be dried at about 110° C. for about 2 hours to remove the NMP solution. The dried mixture can then be removed from the substrate. For example, an aluminum substrate can be etched away with HCl. Alternatively, the dried mixture can be removed from the substrate by peeling or otherwise mechanically removing the dried mixture from the substrate. In some embodiments, the substrate comprises polyethylene terephthalate (PET), including for example Mylar®. In certain embodiments, the dried mixture is a film or sheet. In some embodiments, the dried mixture is optionally cured, block 104. In some embodiments, the dried mixture may be further dried. For example, the dried mixture can placed in a hot press (e.g., between graphite plates in an oven). A hot press can be used to further dry and/or cure and to keep the dried mixture flat. For example, the dried mixture from a polyamic acid and NMP solution can be hot pressed at about 200° C. for about 8 to 16 hours. Alternatively, the entire process including casting and drying can be done as a roll-to-roll process using standard film-handling equipment. The dried mixture can be rinsed to remove any solvents or etchants that may remain. For example, de-ionized (DI) water can be used to rinse the dried mixture. In certain embodiments, tape casting techniques can be used for the casting. In some embodiments, the mixture can be coated on a substrate by a slot die coating process (e.g., metering a constant or substantially constant weight and/or volume through a set or substantially set gap). In some other embodiments, there is no substrate for casting and the anode film does not need to be removed from any substrate. The dried mixture may be cut or mechanically sectioned into smaller pieces.

The mixture further goes through pyrolysis to convert the polymer precursor to carbon, block 105. In certain embodiments, the mixture is pyrolysed in a reducing atmosphere. For example, an inert atmosphere, a vacuum and/or flowing argon, nitrogen, or helium gas can be used. In some embodiments, the mixture is heated to about 900° C. to about 1350° C. For example, polyimide formed from polyamic acid can be carbonized at about 1175° C. for about one hour. In certain embodiments, the heat up rate and/or cool down rate of the mixture is about 10° C./min. A holder may be used to keep the mixture in a particular geometry. The holder can be graphite, metal, etc. In certain embodiments, the mixture is held flat. After the mixture is pyrolysed, tabs can be attached to the pyrolysed material to form electrical contacts. For example, nickel, copper or alloys thereof can be used for the tabs.

In certain embodiments, one or more of the methods described herein can be carried out in a continuous process. In certain embodiments, casting, drying, possibly curing and pyrolysis can be performed in a continuous process. For example, the mixture can be coated onto a glass or metal cylinder. The mixture can be dried while rotating on the cylinder to create a film. The film can be transferred as a roll or peeled and fed into another machine for further processing. Extrusion and other film manufacturing techniques known in industry could also be utilized prior to the pyrolysis step.

Pyrolysis of the precursor results in a carbon material (e.g., at least one carbon phase). In certain embodiments, the carbon material is a hard carbon. In some embodiments, the precursor is any material that can be pyrolysed to form a hard carbon. When the mixture includes one or more additional materials or phases in addition to the carbonized precursor, a composite material can be created. In particular, the mixture can include silicon particles, creating a silicon-carbon (e.g., at least one first phase comprising silicon and at least one second phase comprising carbon) or silicon-carbon-carbon (e.g., at least one first phase comprising silicon, at least one second phase comprising carbon, and at least one third phase comprising carbon) composite material.

Silicon particles can increase the specific lithium insertion capacity of the composite material. When silicon absorbs lithium ions, it experiences a large volume increase on the order of 300+ volume percent which can cause electrode structural integrity issues. In addition to volumetric expansion related problems, silicon is not inherently electrically conductive, but becomes conductive when it is alloyed with lithium (e.g., lithiation). When silicon de-lithiates, the surface of the silicon loses electrical conductivity. Furthermore, when silicon de-lithiates, the volume decreases which results in the possibility of the silicon particle losing contact with the matrix. The dramatic change in volume also results in mechanical failure of the silicon particle structure, in turn, causing it to pulverize. Pulverization and loss of electrical contact have made it a challenge to use silicon as an active material in lithium-ion batteries. A reduction in the initial size of the silicon particles can prevent further pulverization of the silicon powder as well as minimizing the loss of surface electrical conductivity. Furthermore, adding material to the composite that can elastically deform with the change in volume of the silicon particles can reduce the chance that electrical contact to the surface of the silicon is lost. For example, the composite material can include carbons such as graphite which contributes to the ability of the composite to absorb expansion and which is also capable of intercalating lithium ions adding to the storage capacity of the electrode (e.g., chemically active). Therefore, the composite material may include one or more types of carbon phases.

In some embodiments, the particle size (e.g., diameter or a largest dimension of the silicon particles) can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. All, substantially all, or at least some of the silicon particles may comprise the particle size (e.g., diameter or largest dimension) described above. For example, an average particle size (or the average diameter or the average largest dimension) or a median particle size (or the median diameter or the median largest dimension) of the silicon particles can be less than about 50 µm, less than about 40 µm, less than about 30 µm, less than about 20 µm, less than about 10 µm, less than about 1 µm, between about 10 nm and about 50 µm, between about 10 nm and about 40 µm, between about 10 nm and about 30 µm, between about 10 nm and about 20 µm, between about 0.1 µm and about 20 µm, between about 0.5 µm and about 20 µm, between about 1 µm and about 20 µm, between about 1 µm and about 15 µm, between about 1 µm and about 10 µm, between about 10 nm and about 10 µm, between about 10 nm and about 1 µm, less than about 500 nm, less than about 100 nm, about 100 nm, etc. In some embodiments, the silicon particles may have a distribution of particle sizes. For example, at least about 95%, at least about 90%, at least about 85%, at least about 80%, at least about 70%, or at least about 60% of the particles may have the particle size described herein.

The amount of silicon provided in the mixture or in the composite material can be greater than zero percent by weight of the mixture and/or composite material. In certain embodiments, the amount of silicon can be within a range of from about 0% to about 99% by weight of the composite material, including greater than about 0% to about 99% by weight, greater than about 0% to about 95% by weight, greater than about 0% to about 90%, greater than about 0% to about 35% by weight, greater than about 0% to about 25% by weight, from about 10% to about 35% by weight, at least about 30% by weight, from about 30% to about 99% by weight, from about 30% to about 95% by weight, from about 30% to about 90% by weight, from about 30% to about 80% by weight, at least about 50% by weight, from about 50% to about 99% by weight, from about 50% to about 95% by weight, from about 50% to about 90% by weight, from about 50% to about 80% by weight, from about 50% to about 70% by weight, at least about 60% by weight, from about 60% to about 99% by weight, from about 60% to about 95% by weight, from about 60% to about 90% by weight, from about 60% to about 80% by weight, at least about 70% by weight, from about 70% to about 99% by weight, from about 70% to about 95% by weight, from about 70% to about 90% by weight, etc.

Furthermore, the silicon particles may or may not be pure silicon. For example, the silicon particles may be substantially silicon or may be a silicon alloy. In one embodiment, the silicon alloy includes silicon as the primary constituent along with one or more other elements. As described herein, in some embodiments, the silicon particles may contain aluminum.

As described herein, micron-sized silicon particles can provide good volumetric and gravimetric energy density combined with good cycle life. In certain embodiments, to obtain the benefits of both micron-sized silicon particles (e.g., high energy density) and nanometer-sized silicon particles (e.g., good cycle behavior), silicon particles can have an average particle size or a median particle size in the micron range and a surface including nanometer-sized features. In some embodiments, the silicon particles can have an average particle size (e.g., average diameter or average largest dimension) or a median particle size (e.g., median diameter or median largest diameter) between about 0.1 µm and about 30 µm or between about 0.1 µm and all values up to about 30 µm. For example, the silicon particles can have an average particle size or a median particle size between about 0.1 µm and about 20 µm, between about 0.5 µm and about 25 µm, between about 0.5 µm and about 20 µm, between about 0.5 µm and about 15 µm, between about 0.5 µm and about 10 µm, between about 0.5 µm and about 5 µm, between about 0.5 µm and about 2 µm, between about 1 µm and about 20 µm, between about 1 µm and about 15 µm, between about 1 µm and about 10 µm, between about 5 µm and about 20 µm, etc. Thus, the average particle size or the median particle size can be any value between about 0.1 µm and about 30 µm, e.g., 0.1 µm, 0.5 µm, 1 µm, 5 µm, 6 µm, 7 µm, 8 µm, 9 µm, 10 µm, 15 µm, 20 µm, 25 µm, and 30 µm.

The nanometer-sized features can include an average feature size (e.g., an average diameter or an average largest dimension) between about 1 nm and about 1 μm, between about 1 nm and about 750 nm, between about 1 nm and about 500 nm, between about 1 nm and about 250 nm, between about 1 nm and about 100 nm, between about 10 nm and about 500 nm, between about 10 nm and about 250 nm, between about 10 nm and about 100 nm, between about 10 nm and about 75 nm, or between about 10 nm and about 50 nm. The features can include silicon.

The amount of carbon obtained from the precursor can be about 50 weight percent from polyamic acid. In certain embodiments, the amount of carbon obtained from the precursor in the composite material can be greater than 0% to about 95% by weight such as about 1% to about 95% by weight, about 1% to about 90% by weight, 1% to about 80% by weight, about 1% to about 70% by weight, about 1% to about 60% by weight, about 1% to about 50% by weight, about 1% to about 40% by weight, about 1% to about 30% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. For example, the amount of carbon obtained from the precursor can be about 1%, about 5%, about 10% by weight, about 15% by weight, about 20% by weight, about 25% by weight, etc. from the precursor.

The carbon from the precursor can be hard carbon. Hard carbon can be a carbon that does not convert into graphite even with heating in excess of 2800 degrees Celsius. Precursors that melt or flow during pyrolysis convert into soft carbons and/or graphite with sufficient temperature and/or pressure. Hard carbon may be selected since soft carbon precursors may flow and soft carbons and graphite are mechanically weaker than hard carbons. Other possible hard carbon precursors can include phenolic resins, epoxy resins, and other polymers that have a very high melting point or are crosslinked. In some embodiments, the amount of hard carbon in the composite material can have a value within a range of greater than 0% to about 95% by weight such as about 1% to about 95% by weight, about 1% to about 90% by weight, about 1% to about 80% by weight, about 1% to about 70% by weight, about 1% to about 60% by weight, about 1% to about 50% by weight, about 1% to about 40% by weight, about 1% to about 30% by weight, about 5% to about 95% by weight, about 5% to about 90% by weight, about 5% to about 80% by weight, about 5% to about 70% by weight, about 5% to about 60% by weight, about 5% to about 50% by weight, about 5% to about 40% by weight, about 5% to about 30% by weight, about 10% to about 95% by weight, about 10% to about 90% by weight, about 10% to about 80% by weight, about 10% to about 70% by weight, about 10% to about 60% by weight, about 10% to about 50% by weight, about 10% to about 40% by weight, about 10% to about 30% by weight, about 10% to about 25% by weight, etc. In some embodiments, the amount of hard carbon in the composite material can be about 1% by weight, about 5% by weight, about 10% by weight, about 20% by weight, about 30% by weight, about 40% by weight, about 50% by weight, or more than about 50% by weight. In certain embodiments, the hard carbon phase is substantially amorphous. In other embodiments, the hard carbon phase is substantially crystalline. In further embodiments, the hard carbon phase includes amorphous and crystalline carbon. The hard carbon phase can be a matrix phase in the composite material. The hard carbon can also be embedded in the pores of the additives including silicon. The hard carbon may react with some of the additives to create some materials at interfaces. For example, there may be a silicon carbide layer between silicon particles and the hard carbon.

In certain embodiments heating the mixture to a desired pyrolysis temperature may further result in the surface modification of silicon particles present in the mixture. In some embodiments pyrolysis of the mixture may result in the formation of a surface coating on at least 50% of the silicon particles present in the mixture. In some embodiments pyrolysis of the mixture may result in the formation of a surface coating on at least 60%, 70%, 80%, 90% or 99% of the silicon particles present in the mixture. In some embodiments, the surface coatings form a substantially continuous layer on the silicon particles.

In some embodiments, the carbonized precursor or resin may contact the surface of the silicon particles. In certain embodiments, the carbonized precursor in contact with the silicon particle surface may be one or more types of carbon phases resulting from pyrolysis of the precursor. The one or more types of carbon phases of the carbonized precursor in contact with the silicon particle surface may react with the silicon particles during pyrolysis to thereby form silicon carbide on the silicon particle surface. Therefore, in some embodiments, the surface coatings may comprise carbon, silicon carbide, and/or a mixture of carbon and silicon carbide.

In some embodiments, as described further below, the silicon particles present in the mixture may comprise a native silicon oxide (SiO, $SiO_2$, $SiO_x$) surface layer. In certain embodiments, the carbonized precursor in contact with the silicon particle surface may react with the naturally occurring native silicon oxide surface layer to form silicon carbide. In some embodiments the carbonized precursor in contact with the silicon particle surface may react with substantially all of the native silicon oxide layer to form silicon carbide. Therefore, the surface coatings on the silicon particles may comprise, in some embodiments, carbon and silicon carbide, wherein the surface coating is substantially free of silicon oxide. In some embodiments a first portion of the surface coatings may comprise silicon carbide while a second portion may comprise a mixture of silicon carbide and carbon. In some other embodiments, the carbonized precursor in contact with the silicon particle surface may not fully convert the native silicon oxide layer to silicon carbide, and the resultant surface coating or coatings may comprise carbon, silicon carbide, and one or more silicon oxides, such as SiO, $SiO_2$, and $SiO_x$. In some embodiments, the carbonized precursor in contact with the silicon particle surface may be completely reacted, resulting in surface coatings that comprise silicon carbide. In some embodiments substantially all of the surface coatings may comprise silicon carbide. In some embodiments, such surface coatings may be substantially free of silicon oxide and/or carbon.

In certain embodiments, the pyrolyzed mixture can include silicon particles having carbon and/or silicon carbide surface coatings creating a silicon-carbon-silicon carbide (e.g., at least one first phase comprising silicon, at least one second phase comprising carbon, and at least a third phase comprising silicon carbide) or silicon-carbon-carbon-silicon carbide (e.g., at least one first phase comprising silicon, at least one second phase comprising carbon, at least one third phase comprising carbon, and at least a fourth phase comprising silicon carbide) composite material.

Additionally, surface coatings on the silicon particles described herein can help to constrain the outward expansion of the silicon particle during lithiation. By constraining outward particle expansion during lithiation, the surface coatings can help prevent mechanical failure of the silicon particles and ensure good electrical contact. The surface coatings can further enhance the electronic charge transfer within the electrode. Controlled and optimized surface modification of silicon particles in the anode may also significantly improve capacity retention during cycling of an associated battery cell.

Moreover, the surface coatings substantially affect the reactions that occur between the anode materials and the electrolyte within a battery. The surface coatings can help reduce unwanted reactions. During high temperature pyrolysis, the formed surface coatings and the removal of unwanted native oxide ($SiO_2$) via conversion into more stable and unreactive SiC can provide higher reversible capacity with minimized irreversible capacity loss. Irreversible capacity loss can be due to formation and build-up of a solid electrolyte interface (SEI) layer that consumes lithium. This becomes a more prominent issue for silicon particles because nano- and micro-scale silicon particles have large surface areas and larger silicon particles tend to pulverize during lithiation and delithiation which can introduce additional particle surface area. Additionally, irreversible capacity loss can be due to the reaction of lithium with undesirable native silicon oxides (Equation 1) which are unavoidable during processing and storage of silicon anode materials.

$$SiO_x + yLi + ye^- \rightarrow Si + Li_yO_x \qquad \text{(Equation 1)}$$

Therefore, the surface modification of the silicon particles by carbon and/or silicon carbide may aid in the formation of a relatively stable solid electrolyte interface layer and may reduce or eliminate the undesirable reaction of lithium with native silicon oxides on the Si particle surface (Equation 1).

FIG. 1B is a schematic illustration of the formation of silicon carbide on a silicon particle as described above. Initially, a silicon particle comprising a native silicon oxide surface layer is provided in a mixture comprising a precursor as described above. In some embodiments, the mixture is pyrolyzed in a reducing atmosphere. For example, a reducing atmosphere, a vacuum and/or flowing gas including $H_2$, CO, or hydrocarbon gas can be used. In some embodiments, the mixture is heated to about 500° C. to about 1350° C. In some embodiments, the mixture is heated to about 800° C. to about 1200° C. In some embodiments, the mixture is heated to about 1175° C.

The pyrolyzed precursor in contact with the surface of the silicon particle reacts with the native silicon oxide layer of the silicon particle to form silicon carbide. The carbonized precursor in contact with the silicon particle surface is depicted here as continuous and conformal, but may not be continuous or conformal in some other embodiments. Further, in some embodiments, the silicon carbide layer formed from the reaction between the native silicon oxide layer and the carbonized precursor in contact with the silicon particle surface may take the form of a coating or dispersion within the composite anode film. As shown in FIG. 1B, in some embodiments the silicon carbide may not be continuous or conformal on the silicon particle, however in some other embodiments the silicon carbide may be a continuous and/or conformal coating.

In certain embodiments, graphite particles are added to the mixture. Advantageously, graphite can be an electrochemically active material in the battery as well as an elastic deformable material that can respond to volume change of the silicon particles. Graphite is the preferred active anode material for certain classes of lithium-ion batteries currently on the market because it has a low irreversible capacity. Additionally, graphite is softer than hard carbon and can better absorb the volume expansion of silicon additives. In certain embodiments, the particle size (e.g., a diameter or a largest dimension) of the graphite particles can be between about 0.5 microns and about 20 microns. All, substantially all, or at least some of the graphite particles may comprise the particle size (e.g., diameter or largest dimension) described herein. In some embodiments, an average or median particle size (e.g., diameter or largest dimension) of the graphite particles can be between about 0.5 microns and about 20 microns. In some embodiments, the graphite particles may have a distribution of particle sizes. For example, at least about 95%, at least about 90%, at least about 85%, at least about 80%, at least about 70%, or at least about 60% of the particles may have the particle size described herein. In certain embodiments, the composite material can include graphite particles in an amount greater than 0% and less than about 80% by weight, including from about 40% to about 75% by weight, from about 5% to about 30% by weight, from about 5% to about 25% by weight, from about 5% to about 20% by weight, from about 5% to about 15% by weight, etc.

In certain embodiments, conductive particles which may also be electrochemically active are added to the mixture. Such particles can enable both a more electronically conductive composite as well as a more mechanically deformable composite capable of absorbing the large volumetric change incurred during lithiation and de-lithiation. In certain embodiments, a particle size (e.g., diameter or a largest dimension) of the conductive particles can be between about 10 nanometers and about 7 micrometers. All, substantially all, or at least some of the conductive particles may comprise the particle size (e.g., diameter or largest dimension) described herein. In some embodiments, an average or median particle size (e.g., diameter or largest dimension) of the conductive particles can be between about 10 nm and about 7 micrometers. In some embodiments, the conductive particles may have a distribution of particle sizes. For example, at least about 95%, at least about 90%, at least about 85%, at least about 80%, at least about 70%, or at least about 60% of the particles may have the particle size described herein.

In certain embodiments, the mixture can include conductive particles in an amount greater than zero and up to about 80% by weight. In further embodiments, the composite material can include about 45% to about 80% by weight. The conductive particles can be conductive carbon including carbon blacks, carbon fibers, carbon nanofibers, carbon nanotubes, etc. Many carbons that are considered as conductive additives that are not electrochemically active become active once pyrolyzed in a polymer matrix. Alternatively, the conductive particles can be metals or alloys including copper, nickel, or stainless steel.

In certain embodiments, an electrode can include a composite material described herein. For example, a composite material can form a self-supported monolithic electrode. The pyrolysed carbon phase (e.g., hard carbon phase) of the composite material can hold together and structurally support the particles that were added to the mixture. In certain embodiments, the self-supported monolithic electrode does not include a separate collector layer and/or other supportive structures. In some embodiments, the composite material and/or electrode does not include a polymer beyond trace amounts that remain after pyrolysis of the precursor. In further embodiments, the composite material and/or electrode does not include a non-electrically conductive binder. The composite material may also include porosity, such as about 1% to about 70% or about 5% to about 50% by volume porosity. For example, the porosity can be about 5% to about 40% by volume porosity.

The composite material may also be formed into a powder. For example, the composite material can be ground into a powder. The composite material powder can be used as an active material for an electrode. For example, the composite material powder can be deposited on a collector in a manner similar to making a conventional electrode structure, as known in the industry.

In certain embodiments, an electrode in a battery or electrochemical cell can include a composite material, including composite material with the silicon particles described herein. For example, the composite material can be used for the anode and/or cathode. In certain embodiments, the battery is a lithium ion battery. In further embodiments, the battery is a secondary battery, or in other embodiments, the battery is a primary battery.

Furthermore, the full capacity of the composite material may not be utilized during use of the battery to improve life of the battery (e.g., number charge and discharge cycles before the battery fails or the performance of the battery decreases below a usability level). For example, a composite material with about 70% by weight silicon particles, about 20% by weight carbon from a precursor, and about 10% by weight graphite may have a maximum gravimetric capacity of about 3000 mAh/g, while the composite material may only be used up to an gravimetric capacity of about 550 to about 1500 mAh/g. Although, the maximum gravimetric capacity of the composite material may not be utilized, using the composite material at a lower capacity can still achieve a higher capacity than certain lithium ion batteries. In certain embodiments, the composite material is used or only used at an gravimetric capacity below about 70% of the composite material's maximum gravimetric capacity. For example, the composite material is not used at an gravimetric capacity above about 70% of the composite material's maximum gravimetric capacity. In further embodiments, the composite material is used or only used at an gravimetric capacity below about 50% of the composite material's maximum gravimetric capacity or below about 30% of the composite material's maximum gravimetric capacity.

Silicon Particles

Described herein are silicon particles for use in battery electrodes (e.g., anodes and cathodes). Anode electrodes currently used in the rechargeable lithium-ion cells typically have a specific capacity of approximately 200 milliamp hours per gram (including the metal foil current collector, conductive additives, and binder material). Graphite, the active material used in most lithium ion battery anodes, has a theoretical energy density of 372 milliamp hours per gram (mAh/g). In comparison, silicon has a high theoretical capacity of 4200 mAh/g. Silicon, however, swells in excess of 300% upon lithium insertion. Because of this expansion, anodes including silicon should be able to expand while allowing for the silicon to maintain electrical contact with the silicon.

Some embodiments provide silicon particles that can be used as an electro-chemically active material in an electrode. The electrode may include binders and/or other electro-chemically active materials in addition to the silicon particles. For example, the silicon particles described herein can be used as the silicon particles in the composite materials described herein. In another example, an electrode can have an electro-chemically active material layer on a current collector, and the electro-chemically active material layer includes the silicon particles. The electro-chemically active material may also include one or more types of carbon.

Advantageously, the silicon particles described herein can improve performance of electro-chemically active materials such as improving capacity and/or cycling performance. Furthermore, electro-chemically active materials having such silicon particles may not significantly degrade as a result of lithiation of the silicon particles.

In certain embodiments, the silicon particles can have an average particle size, for example an average diameter or an average largest dimension, between about 10 nm and about 40 µm as described herein. Further embodiments can include average particle sizes of between about 1 µm and about 15 µm, between about 10 nm and about 1 µm, and between about 100 nm and about 10 µm. Silicon particles of various sizes can be separated by various methods such as by air classification, sieving or other screening methods. For example, a mesh size of 325 can be used separate particles that have a particle size less than about 44 µm from particles that have a particle size greater than about 44 µm.

Furthermore, the silicon particles may have a distribution of particle sizes. For example, at least about 90% of the particles may have particle size, for example a diameter or a largest dimension, between about 10 nm and about 40 µm, between about 1 µm and about 15 µm, between about 10 nm and about 1 µm, and/or larger than 200 nm.

In some embodiments, the silicon particles may have an average surface area per unit mass of between about 1 to about 100 $m^2/g$, about 1 to about 80 $m^2/g$, about 1 to about 60 $m^2/g$, about 1 to about 50 $m^2/g$, about 1 to about 30 $m^2/g$, about 1 to about 10 $m^2/g$, about 1 to about 5 $m^2/g$, about 2 to about 4 $m^2/g$, or less than about 5 $m^2/g$.

In certain embodiments, the silicon particles are at least partially crystalline, substantially crystalline, and/or fully crystalline. Furthermore, the silicon particles may be substantially pure silicon.

Figure 2A:
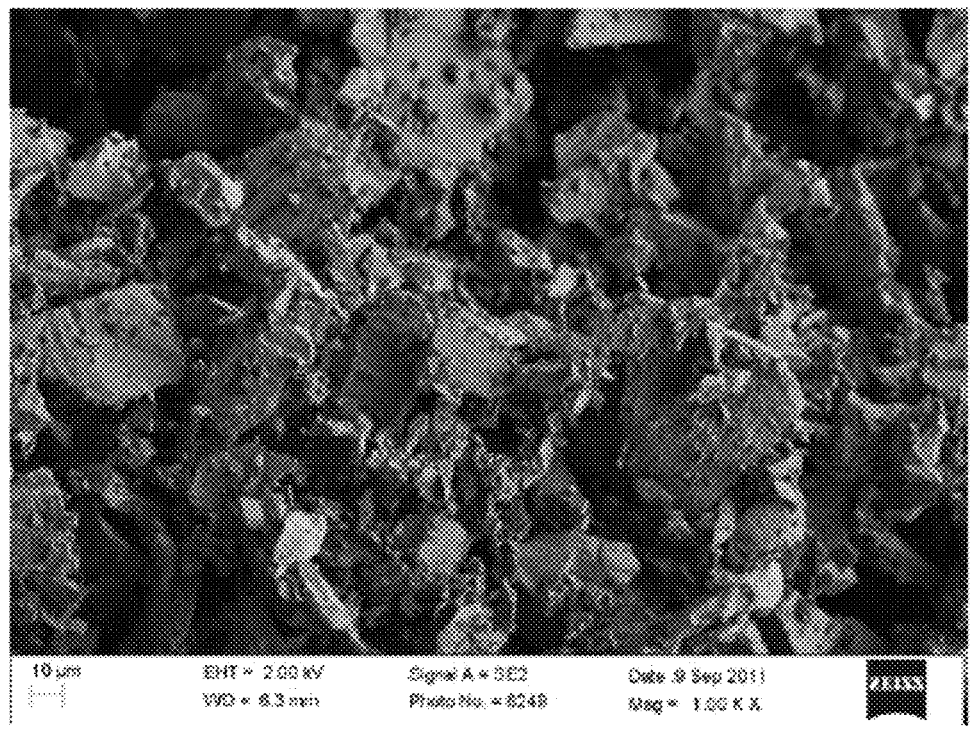
FIGS. 2A and 2B are SEM micrographs of one embodiment of micron-sized silicon particles milled-down from larger silicon particles.
Figure 2B:
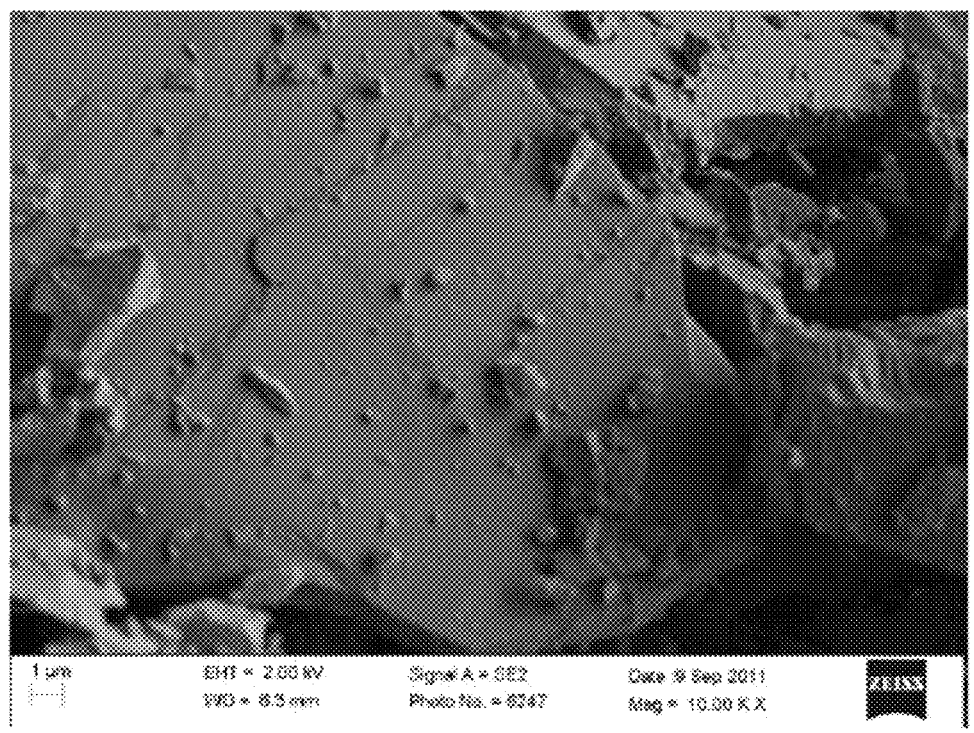

Compared with the silicon particles used in conventional electrodes, the silicon particles described herein for some embodiments can generally have a larger average particle size. In some embodiments, the average surface area of the silicon particles described herein can be generally smaller. Without being bound to any particular theory, the lower surface area of the silicon particles described herein may contribute to the enhanced performance of electrochemical cells. Typical lithium ion type rechargeable battery anodes would contain nano-sized silicon particles. In an effort to further increase the capacity of the cell, smaller silicon particles (such as those in nano-size ranges) are being used for making the electrode active materials. In some cases, the silicon particles are milled to reduce the size of the particles. Sometimes the milling may result in roughened or scratched particle surface, which also increases the surface area. However, the increased surface area of silicon particles may actually contribute to increased degradation of electrolytes, which lead to increased irreversible capacity loss. FIGS. 2A and 2B are SEM micrographs of an example embodiment of silicon particles milled-down from larger silicon particles. As shown in the figures, certain embodiments may have a roughened surface.

Figure 2C:
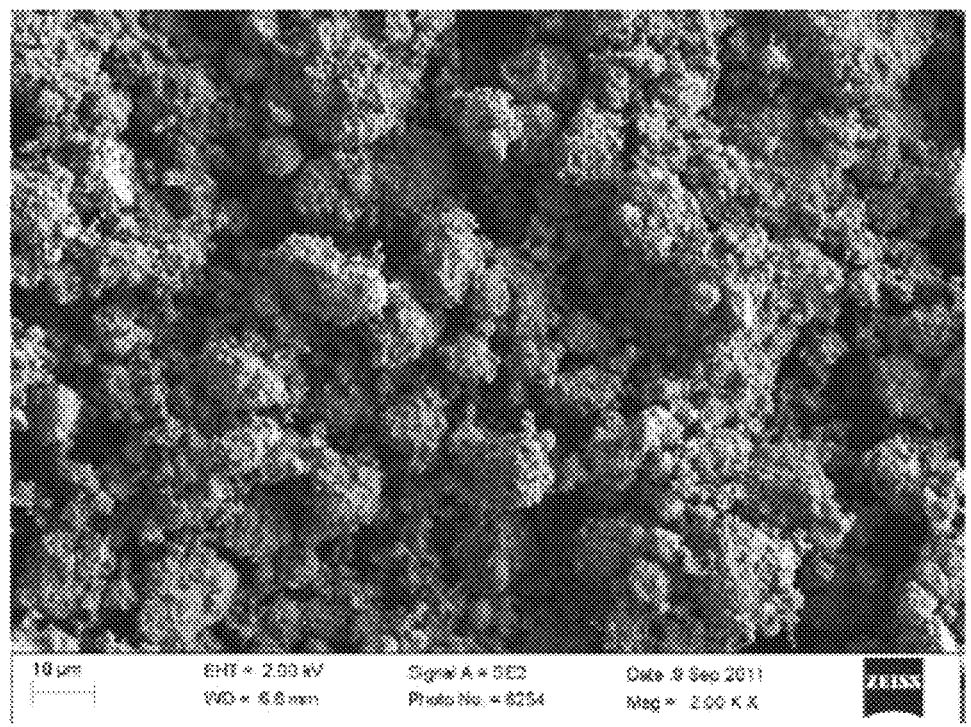
FIGS. 2C and 2D are SEM micrographs of one embodiment of micron-sized silicon particles with nanometer-sized features on the surface.
Figure 2D:
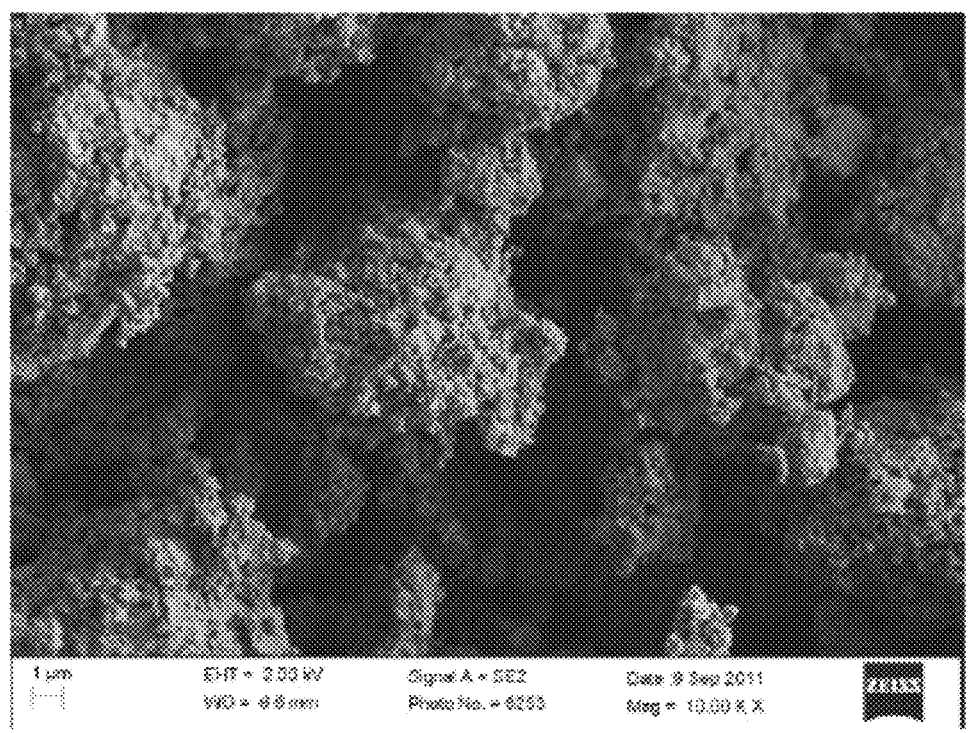

As described herein, certain embodiments include silicon particles with surface roughness in nanometer-sized ranges, e.g., micron-sized silicon particles with nanometer-sized features on the surface. FIGS. 2C and 2D are SEM micrographs of an example embodiment of such silicon particles. Various such silicon particles can have an average particle size (e.g., an average diameter or an average largest dimension) in the micron range (e.g., as described herein, between about 0.1 µm and about 30 µm) and a surface including nanometer-sized features (e.g., as described herein, between about 1 nm and about 1 µm, between about 1 nm and about 750 nm, between about 1 nm and about 500 nm, between about 1 nm and about 250 nm, between about 1 nm and about 100 nm, between about 10 nm and about 500 nm, between about 10 nm and about 250 nm, between about 10 nm and about 100 nm, between about 10 nm and about 75 nm, or between about 10 nm and about 50 nm). The features can include silicon.

Compared to the example embodiment shown in FIGS. 2A and 2B, silicon particles with a combined micron/nanometer-sized geometry (e.g., FIGS. 2C and 2D) can have a higher surface area than milled-down particles. Thus, the silicon particles to be used can be determined by the desired application and specifications.

Even though certain embodiments of silicon particles have nanometer-sized features on the surface, the total surface area of the particles can be more similar to micron-sized particles than to nanometer-sized particles. For example, micron-sized silicon particles (e.g., silicon milled-down from large particles) typically have an average surface area per unit mass of over about 0.5 $m^2/g$ and less than about 2 $m^2/g$ (for example, using Brunauer Emmet Teller (BET) particle surface area measurements), while nanometer-sized silicon particles typically have an average surface area per unit mass of above about 100 $m^2/g$ and less than about 500 $m^2/g$. Certain embodiments described herein can have an average surface area per unit mass between about 1 $m^2/g$ and about 30 $m^2/g$, between about 1 $m^2/g$ and about 25 $m^2/g$, between about 1 $m^2/g$ and about 20 $m^2/g$, between about 1 $m^2/g$ and about 10 $m^2/g$, between about 2 $m^2/g$ and about 30 $m^2/g$, between about 2 $m^2/g$ and about 25 $m^2/g$, between about 2 $m^2/g$ and about 20 $m^2/g$, between about 2 $m^2/g$ and about 10 $m^2/g$, between about 3 $m^2/g$ and about 30 $m^2/g$, between about 3 $m^2/g$ and about 25 $m^2/g$, between about 3 $m^2/g$ and about 20 $m^2/g$, between about 3 $m^2/g$ and about 10 $m^2/g$ (e.g., between about 3 $m^2/g$ and about 6 $m^2/g$), between about 5 $m^2/g$ and about 30 $m^2/g$, between about 5 $m^2/g$ and about 25 $m^2/g$, between about 5 $m^2/g$ and about 20 $m^2/g$, between about 5 $m^2/g$ and about 15 $m^2/g$, or between about 5 $m^2/g$ and about 10 $m^2/g$.

Figure 2E:
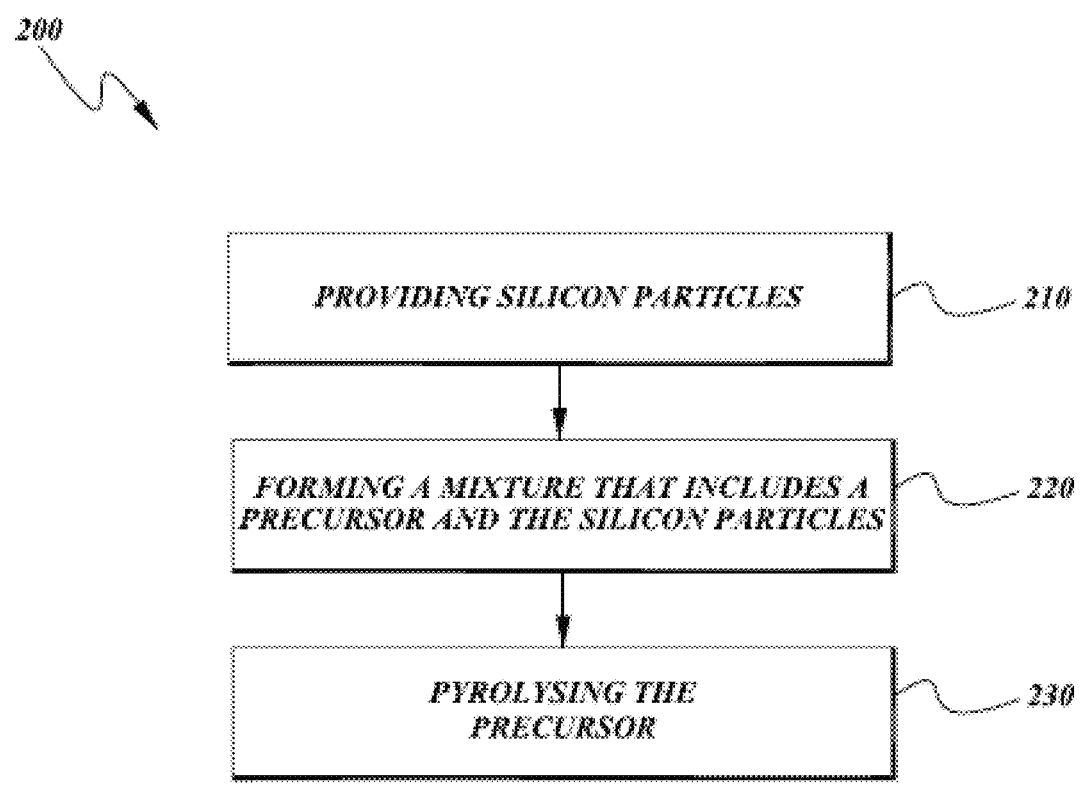
FIG. 2E illustrates an example embodiment of a method of forming a composite material.

Various examples of micron-sized silicon particles with nanometer-sized features can be used to form certain embodiments of composite materials as described herein. For example, FIG. 2E illustrates an example method 200 of forming certain embodiments of the composite material. The method 200 includes providing a plurality of silicon particles (for example, silicon particles having an average particle size between about 0.1 µm and about 30 µm and a surface including nanometer-sized features), block 210. The method 200 further includes forming a mixture that includes a precursor and the plurality of silicon particles, block 220. The method 200 further includes pyrolysing the precursor, block 230, to convert the precursor into one or more types of carbon phases to form the composite material.

With respect to block 210 of method 200, silicon with the characteristics described herein can be synthesized as a product or byproduct of a Fluidized Bed Reactor (FBR) process. For example, in the FBR process, useful material can be grown on seed silicon material. Typically, particles can be removed by gravity from the reactor. Some fine particulate silicon material can exit the reactor from the top of the reactor or can be deposited on the walls of the reactor. The material that exits the top of the reactor or is deposited on the walls of the reactor (e.g., byproduct material) can have nanoscale features on a microscale particle. In some such processes, a gas (e.g., a nitrogen carrier gas) can be passed through the silicon material. For example, the silicon material can be a plurality of granular silicon. The gas can be passed through the silicon material at high enough velocities to suspend the solid silicon material and make it behave as a fluid. The process can be performed under an inert atmosphere, e.g., under nitrogen or argon. In some embodiments, silane gas can also be used, for example, to allow for metal silicon growth on the surface of the silicon particles. The growth process from a gas phase can give the silicon particles the unique surface characteristics, e.g., nanometer-sized features. Since silicon usually cleaves in a smooth shape, e.g., like glass, certain embodiments of silicon particles formed using the FBR process can advantageously acquire small features, e.g., in nanometer-sized ranges, that may not be as easily achievable in some embodiments of silicon particles formed by milling from larger silicon particles.

In addition, since the FBR process can be under an inert atmosphere, very high purity particles (for example, higher than 99.9999% purity) can be achieved. In some embodiments, purity of between about 99.9999% and about 99.999999% can be achieved. In some embodiments, the FBR process can be similar to that used in the production of solar-grade polysilicon while using 85% less energy than the traditional Siemens method, where polysilicon can be formed as trichlorosilane decomposes and deposits additional silicon material on high-purity silicon rods at 1150° C. Because nanometer-sized silicon particles have been shown to increase cycle life performance in electrochemical cells, micron-sized silicon particles have not been contemplated for use as electrochemical active materials in electrochemical cells.

With respect to blocks 220 and 230 of method 200, forming a mixture that includes a precursor and the plurality of silicon particles, block 220, and pyrolysing the precursor, block 230, to convert the precursor into one or more types of carbon phases to form the composite material can be similar to blocks 101 and 105 respectively, of method 100 described herein. In some embodiments, pyrolysing (e.g., at about 900° C. to about 1350° C.) occurs at temperatures below the melting point of silicon (e.g., at about 1414° C.) without affecting the nanometer-sized features of the silicon particles.

In accordance with certain embodiments described herein, certain micron-sized silicon particles with nanometer surface feature can achieve high energy density, and can be used in composite materials and/or electrodes for use in electro-chemical cells to improve performance during cell cycling.

Surface Modification of Silicon Particles

As described herein, silicon particles may be used as electrochemically active material in an electrode. In some embodiments, the silicon particles may include a surface coating. The surface coating may include silicon carbide formed by a reaction between carbonized precursor and a silicon oxide surface layer on the silicon particles. In some embodiments, the surface coating comprising silicon carbide may act as an expansion buffer for silicon particles during cycling. Without being bound by theory, the nature of the surface of the silicon particles (e.g., the nature of the oxide layer) may affect the silicon carbide layer formed.

Silicon reacts with oxygen to create an oxide layer. For example, silicon surfaces exposed to air have a thin native oxide layer. Silicon also can react with water (e.g., moisture treated silicon) to create an oxide layer. Oxide layers formed with oxygen can have different properties than oxide layers formed with water. Using moisture treated silicon particles in various embodiments of electrodes and/or electrochemical cells described herein can provide surface coatings having silicon carbide with improved properties. In some instances, a more stable and/or a substantially stable solid electrolyte interface/interphase (SEI) can be provided, improving capacity retention and cycling performance.

Figure 3A:
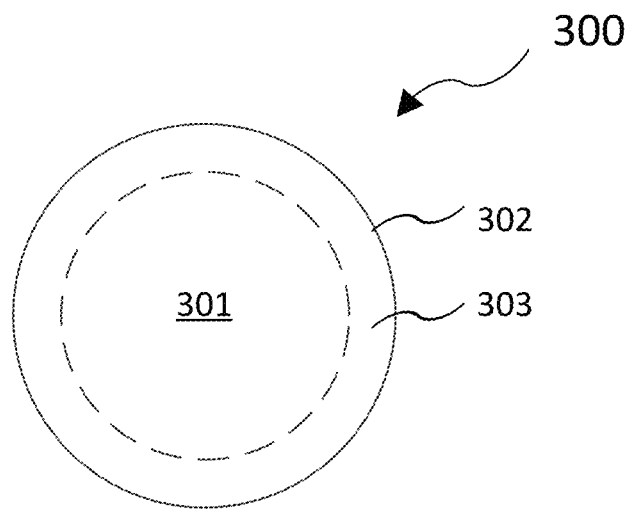
FIG. 3A schematically illustrates an example moisture treated silicon particle.

FIG. 3A schematically illustrates an example moisture treated silicon particle 300. For simplicity, the silicon particle 300 in FIG. 3A is illustrated as having a circular cross-sectional shape such as for a spherical or cylindrical particle. However, it would be understood that "silicon particle" 300 described herein can have any regular or irregular cross-sectional shape and is not limited to a spherical or cylindrical particle.

With continued reference to FIG. 3A, the example silicon particle 300 comprises bulk material 301 and a surface 302. As described herein, the silicon particle 300 can also have an outer region 303. For example, the outer region 303 can extend into the particle 300 some distance from the surface 302. In some instances, the outer region 303 can be different from the rest of the bulk material 301. For example, compared to the rest of the bulk material 301, the outer region 303 can include a wet oxide as opposed to a dry oxide. As another example, the outer region 303 can include one or more layers formed due to the presence of moisture (e.g., a hydroxide). In some embodiments, the outer region 303 can be defined as extending about 25 nm, about 20 nm, or about 15 nm deep from the surface. Other examples are possible.

In various embodiments, moisture treated silicon particles can be produced by adding moisture to the silicon material that is used as a precursor for the silicon particle 300. For example, adding moisture can include wetting and drying. In some embodiments, wetting can introduce liquid and/or an oxidizing agent to the silicon material. Liquids can include water, such as de-ionized water, distilled water, purified water, ultrapure water, and/or alcohol, etc. Oxidizing agents can include potassium hydroxide, hydrogen peroxide, etc. Silicon material that can be used as a precursor include various types of silicon materials as described herein, including but not limited to silicon powders, silicon fibers, porous silicon, ball-milled silicon, etc.

In some embodiments, silicon powders (or other silicon materials) can be immersed into the liquid and/or oxidizing agent. The weight ratio between the silicon powders and liquid and/or oxidizing agent can be in a range from about 1:1 to about 1:6 or in a range within this range. For example, the weight ratio can be about 1:1, about 1:2, about 1:3, about 1:4, about 1:5, about 1:6, etc. Other ratios are possible. The mixture can be stirred to allow wetting of silicon surfaces. In some instances, the mixture can be stirred thoroughly or substantially thoroughly to allow the silicon surfaces to be fully wetted or substantially fully wetted. Drying can reduce the amount of (e.g., remove in some instances) the liquid and/or oxidizing agent from the silicon powders to form the moisture treated silicon particles 300.

In some embodiments, the silicon powders can be dried in air or an inert atmosphere. For example, the silicon powders can be dried at a temperature of at least about 140° C., at least about 145° C., at least about 150° C., at least about 155° C., at least about 160° C., at least about 165° C., at least about 170° C., at least about 175° C., at least about 180° C., etc. In some instances, the silicon powders can be dried at a temperature in the range of about 140° C. to about 180° C. or in a range within this range (e.g., about 145° C. to about 180° C., about 150° C. to about 180° C., about 155° C. to about 180° C., about 155° C. to about 175° C., etc.). In some embodiments, the silicon powders can be dried at about 150° C., at about 155° C., at about 160° C., at about 165° C., at about 170° C., at about 175° C., at about 180° C., etc. The silicon powders can subjected to the drying temperature until a sufficient amount of the moisture has been removed. For example, the silicon particles can be dried for at least about 20 hours, at least about 21 hours, at least about 22 hours, at least about 23 hours, at least about 24 hours. In some instances, the silicon powders can be dried for an amount of time in a range from about 20 hours to about 28 hours or in a range within this range (e.g., about 20 hours to about 27 hours, about 22 hours to about 26 hours, etc.). In some embodiments, the silicon powders are dried for about 21 hours, for about 22 hours, for about 23 hours, for about 24 hours, for about 25 hours, for about 26 hours, for about 27 hours, etc.

With continued reference to FIG. 3A, in addition to reducing and/or removing the moisture from the silicon particles, drying can also promote conversion of an outer region 303 that is different from the rest of the bulk material 301.

In some embodiments, the bulk material 301 of silicon particles can include aluminum. Silicon material (e.g., silicon powders) with more than about 0.01%, more than about 0.02%, more than about 0.03%, more than about 0.04%, more than about 0.05%, etc. of aluminum can have certain characteristics and/or properties that change after moisture treatment. Without being bound by theory, moisture treatment can allow the aluminum in the bulk material 301 to be exposed more on the surface 302 compared with no moisture treatment. For example, the surface 302 may be modified such that more aluminum is exposed and/or more aluminum is dissolved and redistributed (e.g., aluminum redistributed toward the surface). In some instances, more aluminum is exposed in the outer regions 303. In some instances, more aluminum is dissolved and redistributed in the outer regions 303 while some of the aluminum may remain within the bulk material 301 surrounded by the outer regions 303. In some other instances, all or substantially all of the aluminum may be exposed and/or dissolved and redistributed in the outer regions 303 of the silicon particles 300. Accordingly, in various embodiments, the outer region 303 of moisture treated silicon particles 300 can include more aluminum compared with the outer region of untreated silicon particles. Without being bound by theory, when used in composite materials described herein, the aluminum in the outer regions 303 of the moisture treated silicon particles 300 can affect the silicon carbide layer formed in composite materials, e.g., producing a more stable SEI layer.

In some embodiments, the outer regions 303 of the moisture treated silicon particles 300 can include an amount of aluminum such that a bulk measurement of the aluminum comprises at least about 0.01% by weight of the silicon particles 300. For example, the silicon particles can include a bulk measurement of aluminum of at least about 0.01%, at least about 0.02%, at least about 0.03%, at least about 0.04%, at least about 0.05%, at least about 0.06%, at least about 0.07%, at least about 0.08%, at least about 0.09%, at least about 0.1%, etc. In some embodiments, the bulk measurement of aluminum can be in a range from about 0.01% to about 1%, from about 0.02% to about 1%, from about 0.03% to about 1%, from about 0.04% to about 1%, from about 0.05% to about 1%, from about 0.06% to about 1%, from about 0.07% to about 1%, from about 0.08% to about 1%, from about 0.09% to about 1%, from about 0.1% to about 0.6%, from about 0.1% to about 0.7%, from about 0.1% to about 0.8%, from about 0.1% to about 0.9%, from about 0.1% to about 1%, from about 0.2% to about 0.6%, from about 0.2% to about 0.7%, from about 0.2% to about 0.8%, from about 0.2% to about 0.9%, from about 0.2% to about 1%, from about 0.3% to about 0.6%, from about 0.3% to about 0.7%, from about 0.3% to about 0.8%, from about 0.3% to about 0.9%, from about 0.3% to about 1%, etc. by weight of the silicon particles. Other examples are possible.

In some embodiments, the bulk measurement of the aluminum can be measured by X-ray Photoelectron Spectroscopy (XPS). In XPS, the elemental composition of a sample can be measured by irradiating x-rays and measuring the kinetic energy and number of electrons escaping the sample. The measurement may be surface-sensitive and hence measure the amount of aluminum present at least at the surface of the silicon particles (e.g., at least in the outer regions 303). Depending on the measurement sensitivity, in some instances, the bulk measurement of aluminum can provide the amount of aluminum in the outer regions 303 of the silicon particles 300 or the amount of aluminum in the entire material of the silicon particles 300 (e.g., the amount in the outer regions 303 and in other areas within the bulk material 301). Other methods known in the art or yet to be developed can be used to measure the amount of aluminum. For example, in some instances, Inductively Coupled Plasma (ICP) analysis including Inductively Coupled Plasma Atomic Emission Spectroscopy (ICP-AES) or Inductively Coupled Plasma Mass Spectrometry (ICP-MS) can be used to measure the amount of aluminum. As another example, in some instances, Energy Dispersive X-ray Spectroscopy (EDS) can be used to measure the amount of aluminum. As another example, in some instances, X-ray Fluorescence (XRF) can be used to measure the amount of aluminum.

In some embodiments, the outer regions 303 of the silicon particles 300 can include an amount of aluminum of at least about 0.001% by weight of the silicon particles. For example, the silicon particles 300 can include an amount of aluminum in the outer regions 303 of at least about 0.001%, at least about 0.002%, at least about 0.003%, at least about 0.004%, at least about 0.005%, etc. In some embodiments, the amount of aluminum in the outer regions 303 can be in a range from about 0.001% to about 0.01%, from about 0.002% to about 0.01%, from about 0.003% to about 0.01%, from about 0.004% to about 0.01%, from about 0.005% to about 0.01%, etc. by weight of the silicon particles.

In some instances, the outer regions 303 of the silicon particles 300 can include an amount of aluminum of at least about 0.01%, at least about 0.02%, at least about 0.03%, at least about 0.04%, at least about 0.05%, at least about 0.06%, at least about 0.07%, at least about 0.08%, at least about 0.09%, at least about 0.1%, etc. In some embodiments, the amount of aluminum in the outer regions 303 can be in a range from about 0.01% to about 1%, from about 0.02% to about 1%, from about 0.03% to about 1%, from about 0.04% to about 1%, from about 0.05% to about 1%, from about 0.06% to about 1%, from about 0.07% to about 1%, from about 0.08% to about 1%, from about 0.09% to about 1%, from about 0.1% to about 0.6%, from about 0.1% to about 0.7%, from about 0.1% to about 0.8%, from about 0.1% to about 0.9%, from about 0.1% to about 1%, from about 0.2% to about 0.6%, from about 0.2% to about 0.7%, from about 0.2% to about 0.8%, from about 0.2% to about 0.9%, from about 0.2% to about 1%, from about 0.3% to about 0.6%, from about 0.3% to about 0.7%, from about 0.3% to about 0.8%, from about 0.3% to about 0.9%, from about 0.3% to about 1%, etc. by weight of the silicon particles. Other examples are possible.

In various embodiments, the aluminum in the outer regions 303 of the silicon particles 300 can be include aluminum oxide, aluminum silicide, or a combination of aluminum oxide and aluminum silicide.

In some embodiments, the moisture treated silicon particles 300 can have surfaces 302 that provide a lower contact angle than those provided by surfaces of untreated silicon particles. Some embodiments of moisture treated silicon particles 300 can have an average contact angle less than about 87.3°, less than about 87.2°, less than about 87.1°, less than about 87°, less than about 86.9°, less than about 86.8°, less than about 86.7°, less than about 86.6°, less than about 86.5°, etc. For example, some moisture treated silicon particles can have an average contact angle in a range from about 80° to about 87.2° or in a range therebetween (e.g., from about 80° to about 87.1°, from about 80° to about 87°, from about 80° to about 86.9°, from about 81° to about 87.1°, from about 81° to about 87°, from about 81° to about 86.9°, from about 82° to about 87.1°, from about 82° to about 87°, from about 82° to about 86.9°, etc.). Without being bound by theory, by having a lower contact angle than those provided by surfaces of untreated silicon particles, various embodiments of moisture treated silicon particles 300 can have surfaces with higher wettability allowing increased mixability in slurries, e.g., in mixtures that form various embodiments of composite materials described herein.

For example, various examples of moisture treated silicon particles can be used to form certain embodiments of composite materials as described herein. For example, the composite material can be used in an electrode for use in an electrochemical cell. The moisture treated silicon particles can have certain characteristics and/or properties as described herein that may improve capacity retention and cycling performance. Without being bound by theory, moisture treated silicon particles have surfaces that can provide for a more stable and/or substantially stable SEI.

Certain embodiments can include a composite material film. The composite material film can include any of the examples of composite material films described herein. For example, the composite material film can have greater than 0% and less than about 99% by weight of silicon particles (e.g., about 50% to about 99% by weight, about 60% to about 99% by weight, about 70% to about 99% by weight, about 75% to about 99% by weight, about 80% to about 99% by weight, etc.), or greater than 0% and less than about 95% by weight of silicon particles (e.g., about 50% to about 95% by weight, about 60% to about 95% by weight, about 70% to about 95% by weight, about 75% to about 95% by weight, about 80% to about 95% by weight, etc.). The silicon particles can include moisture treated silicon particles and/or a combination of moisture treated silicon particles and other silicon particles described herein (e.g., silicon particles with an average particle size from about 0.1 µm to about 40 µm, silicon particles with an average particle size from about 1 µm to about 20 µm, micron-sized silicon particles with nanometer-sized features, etc.). The silicon particles can include aluminum as described herein. The silicon particles can be from about 90% to about 99% pure silicon. As described herein, the silicon particles can have surface coatings comprising silicon carbide or a mixture of carbon and silicon carbide as shown in FIG. 1B. The surface coatings can be a substantially continuous layer. In some embodiments, the surface coatings can include silicon monoxide (SiO), silicon dioxide ($SiO_2$), and/or silicon oxide ($SiO_x$). The composite material film can also have greater than 0% and less than 90% by weight of one or more types of carbon phases. The one or more types of carbon phases can be a substantially continuous phase. In some embodiments, the one or more types of carbon phases can be electrochemically active and/or electrically conductive. In various embodiments, the composite material film can be self-supported.

Figure 3B:
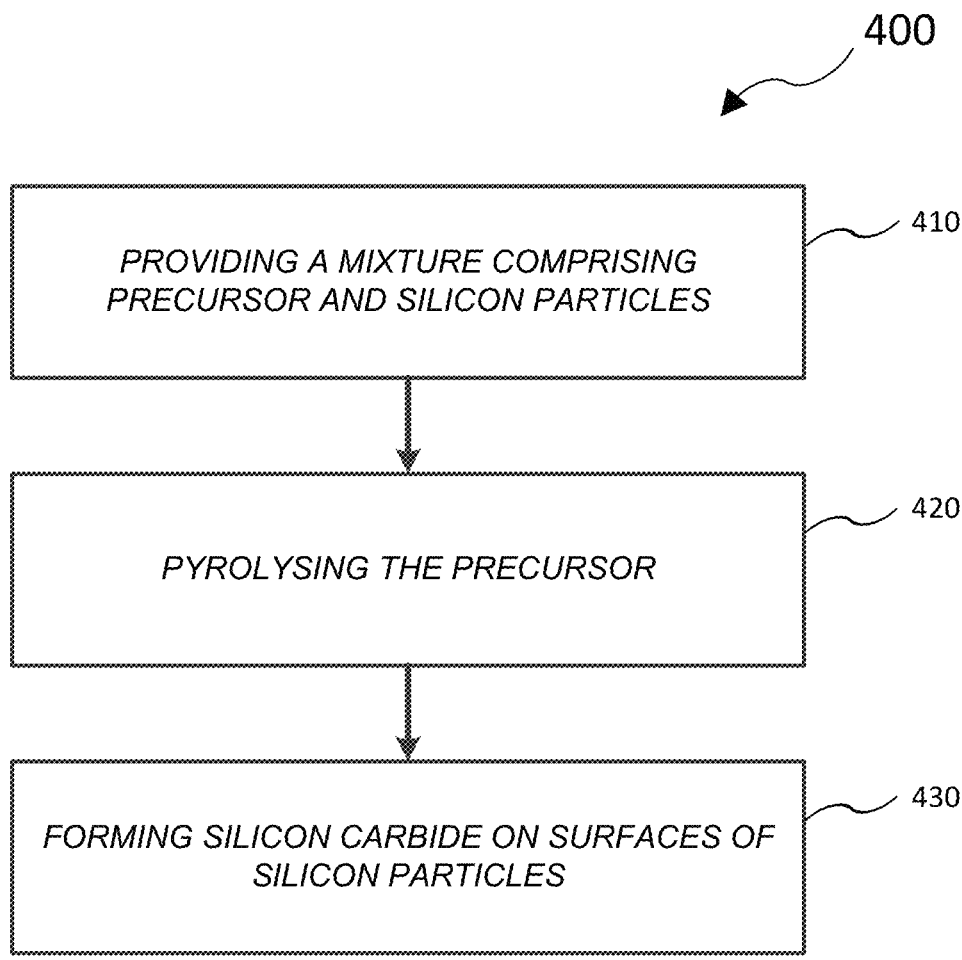
FIG. 3B illustrates an example embodiment of a method of forming a composite material.

FIG. 3B illustrates an example method 400 of forming certain embodiments of the composite material. The method 400 can include providing a mixture comprising a carbon precursor and silicon particles (e.g., moisture treated silicon particles), block 410. The method 400 can also include pyrolysing the precursor to convert the precursor into one or more types of carbon phases, block 420. The method 400 can further include forming silicon carbide on surfaces of the silicon particles, block 430.

With respect to block 410 of method 400, the silicon particles having the characteristics and/or properties as described herein can be provided by using moisture treated silicon particles. In some embodiments, the moisture treated silicon particles can include silicon material treated with a liquid and/or moisture in one or more of a variety of ways. The moisture treated silicon particles can be provided by wetting and drying as described herein. For example, the silicon material can be processed in liquid. In some embodiments, the liquid can include water (e.g., de-ionized water, distilled water, purified water, ultrapure water, etc.), alcohol, and/or other oxidizing agent such as potassium hydroxide or hydrogen peroxide. Silicon material can be boiled in liquid to produce liquid-boiled silicon particles, decanted in liquid to produce liquid-decanted silicon particles, and/or steamed with liquid to produce liquid-steamed silicon particles.

As described herein, the silicon particles can be added to a mixture comprising a carbon precursor. In some such embodiments, alternatively or additionally to treating the silicon material alone with moisture, the silicon particles can be treated with moisture present in and/or added to the carbon precursor. For example, as described herein, the carbon precursor can include a polymer and a solvent. Moisture can be present in and/or added to the polymer and/or solvent. The polymer and solvent can include any of the polymers and solvents described herein. As some examples, the carbon precursor can include polyamideimide, polyamic acid, polyimide, phenolic resin, epoxy resin, etc. The solvent can comprise N-methyl-pyrrolidone (NMP), acetone, diethyl ether, gamma butyrolactone, isopropanol, dimethyl carbonate, ethyl carbonate, dimethoxyethane, ethanol, methanol, etc. Moisture can be added to the polymer and/or solvent. In some instances, the carbon precursor can include a water-soluble polymer, and the solvent can include water.

The silicon material alone or in combination with the mixture can be heat treated to dry the particles. The wetting and drying of the silicon particles can be performed sequentially. However, in some embodiments, the wetting and drying of the silicon particles can be performed simultaneously. For example, moisture can be added to a drying/heating chamber and silicon material alone or in combination with the mixture can be placed into the heating chamber. The heat treatment can be performed at a temperature and time as described herein.

As described herein, the method 400 can also include various steps such as casting the mixture on a substrate, drying the mixture to form a film, removing the film from the substrate, and placing the film in a hot press. Moisture can be added to the mixture or film in any of these steps. Moisture can be added to the mixture or film alternatively or additionally to adding moisture to the silicon material alone.

With respect to block 420 of method 400, the carbon precursor can be pyrolyzed as described herein to convert the precursor into one or more types of carbon phases. In some embodiments, moisture can be added in the pyrolysis chamber. Moisture can be added in the pyrolysis chamber alternatively or additionally to adding moisture to the silicon material alone, alternatively or additionally to adding moisture to the mixture or film, and/or alternatively or additionally to adding moisture into the drying chamber.

With respect to block 430, silicon carbide can be formed on surfaces of the silicon particles. Using silicon particles with certain surface characteristics and properties as described herein (e.g., using moisture treated silicon particles) can affect the silicon carbide layer formed and form a more stable SEI.

As described herein, moisture treated silicon particles can have certain characteristics and properties beneficial in producing composite materials in electrodes for use in electrochemical cells. It would be understood that it may be possible to provide silicon particles having the desired characteristics and properties described herein without moisture treatment. Some such non-moisture treated silicon particles can also be used in composite materials and/or methods of forming composite materials.

EXAMPLES

The below example processes for anode fabrication generally include mixing components together, casting those components onto a removable substrate, drying, curing, removing the substrate, then pyrolyzing the resulting samples. N-Methyl-2-pyrrolidone (NMP) was typically used as a solvent to modify the viscosity of any mixture and render it castable using a doctor blade approach.

Example 1

In Example 1, a polyimide liquid precursor (PI 2611 from HD Microsystems corp.), graphite particles (SLP30 from Timcal corp.), conductive carbon particles (Super P from Timcal corp.), and silicon particles (from Alfa Aesar corp.) were mixed together for 5 minutes using a Spex 8000D machine in the weight ratio of 200:55:5:20. The mixture was then cast onto aluminum foil and allowed to dry in a 90° C. oven, to drive away solvents, e.g., NMP. This is followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 15.8% of PI 2611 derived carbon, 57.9% of graphite particles, 5.3% of carbon resulting from Super P, and 21.1% of silicon by weight.

Figure 4:
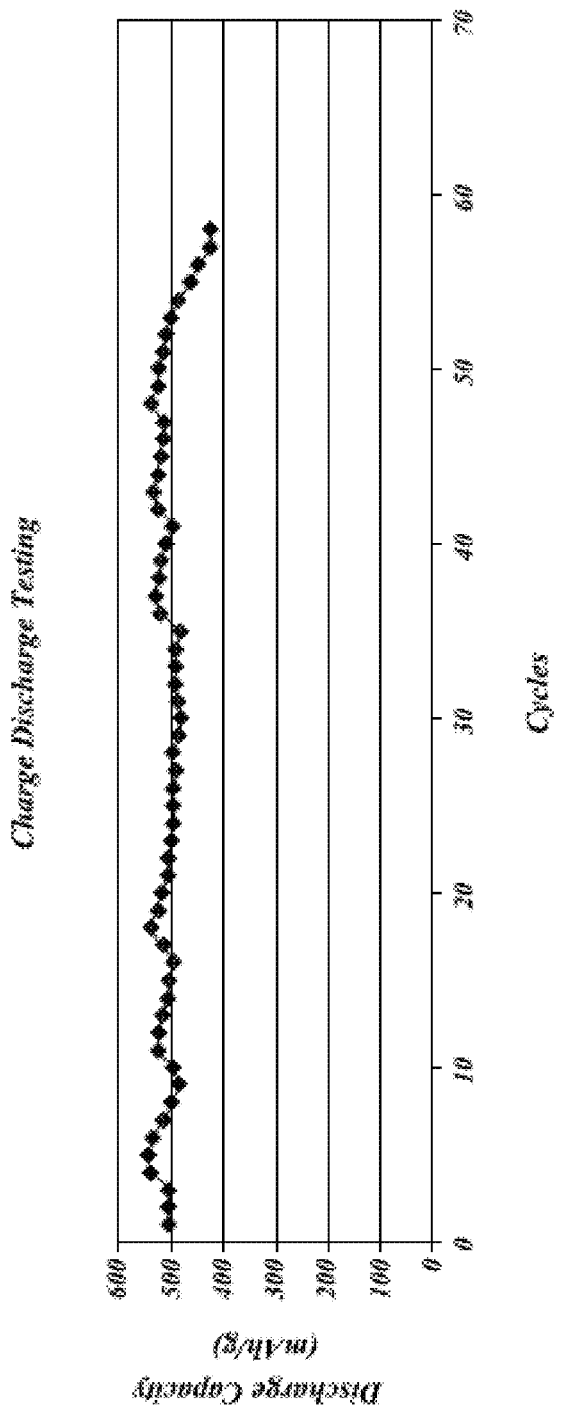
FIG. 4 is a plot of the discharge capacity at an average rate of C/2.6.

The resulting electrodes were then tested in a pouch cell configuration against a lithium NMC oxide cathode. A typical cycling graph is shown in FIG. 4.

Example 2

In Example 2, silicon particles (from EVNANO Advanced Chemical Materials Co. Ltd.) were initially mixed with NMP using a Turbula mixer for a duration of one hour at a 1:9 weight ratio. Polyimide liquid precursor (PI 2611 from HD Microsystems corp.), graphite particles (SLP30 from Timcal corp.), and carbon nanofibers (CNF from Pyrograf corp.) were then added to the Si:NMP mixture in the weight ratio of 200:55:5:200 and vortexed for around 2 minutes. The mixture was then cast onto aluminum foil that was covered by a 21 μm thick copper mesh. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1000° C. under argon. The process resulted in a composition of 15.8% of PI 2611 derived carbon, 57.9% of graphite particles, 5.3% of CNF, and 21.1% of silicon by weight.

Figure 5:
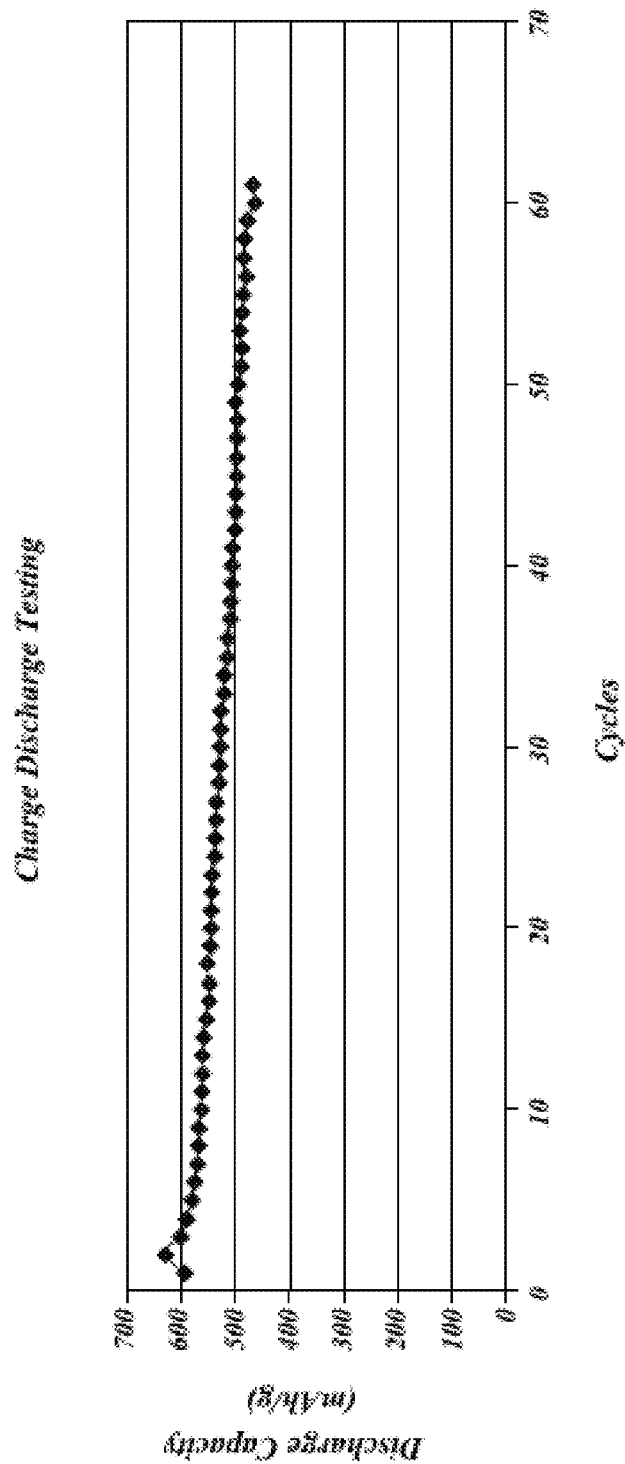
FIG. 5 is a plot of the discharge capacity at an average rate of C/3.

The resulting electrodes were then tested in a pouch cell configuration against a lithium NMC oxide cathode. A typical cycling graph is shown in FIG. 5.

Example 3

In Example 3, polyimide liquid precursor (PI 2611 from HD Microsystems corp.), and 325 mesh silicon particles (from Alfa Aesar corp.) were mixed together using a Turbula mixer for a duration of 1 hour in the weight ratios of 40:1. The mixture was then cast onto aluminum foil and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of 75% of PI 2611 derived carbon and 25% of silicon by weight.

Figure 6:
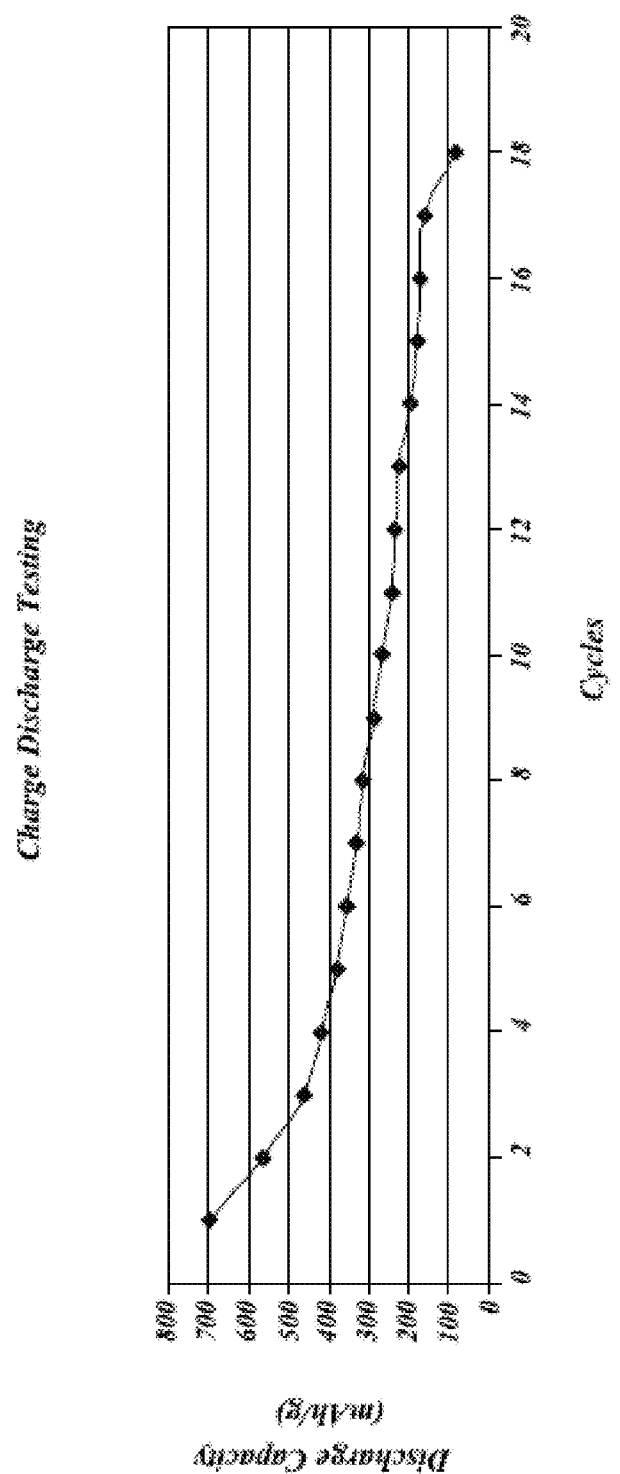
FIG. 6 is a plot of the discharge capacity at an average rate of C/3.3.

The resulting electrodes were then tested in a pouch cell configuration against a lithium NMC Oxide cathode. A typical cycling graph is shown in FIG. 6.

Example 4

In Example 4, silicon microparticles (from Alfa Aesar corp.), polyimide liquid precursor (PI 2611 from HD Microsystems corp.), graphite particles (SLP30 from Timcal corp.), milled carbon fibers (from Fibre Glast Developments corp.), carbon nanofibers (CNF from Pyrograf corp.), carbon nanotubes (from CNANO Technology Limited), conductive carbon particles (Super P from Timcal corp.), conductive graphite particles (KS6 from Timca corp.) were mixed in the weight ratio of 20:200:30:8:4:2:1:15 using a vortexer for 5 minutes. The mixture was then cast onto aluminum foil. The samples were then allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed for around an hour at 1175° C. under argon. The process resulted in a composition similar to the original mixture but with a PI 2611 derived carbon portion that was 7.5% the original weight of the polyimide precursor.

Figure 7:
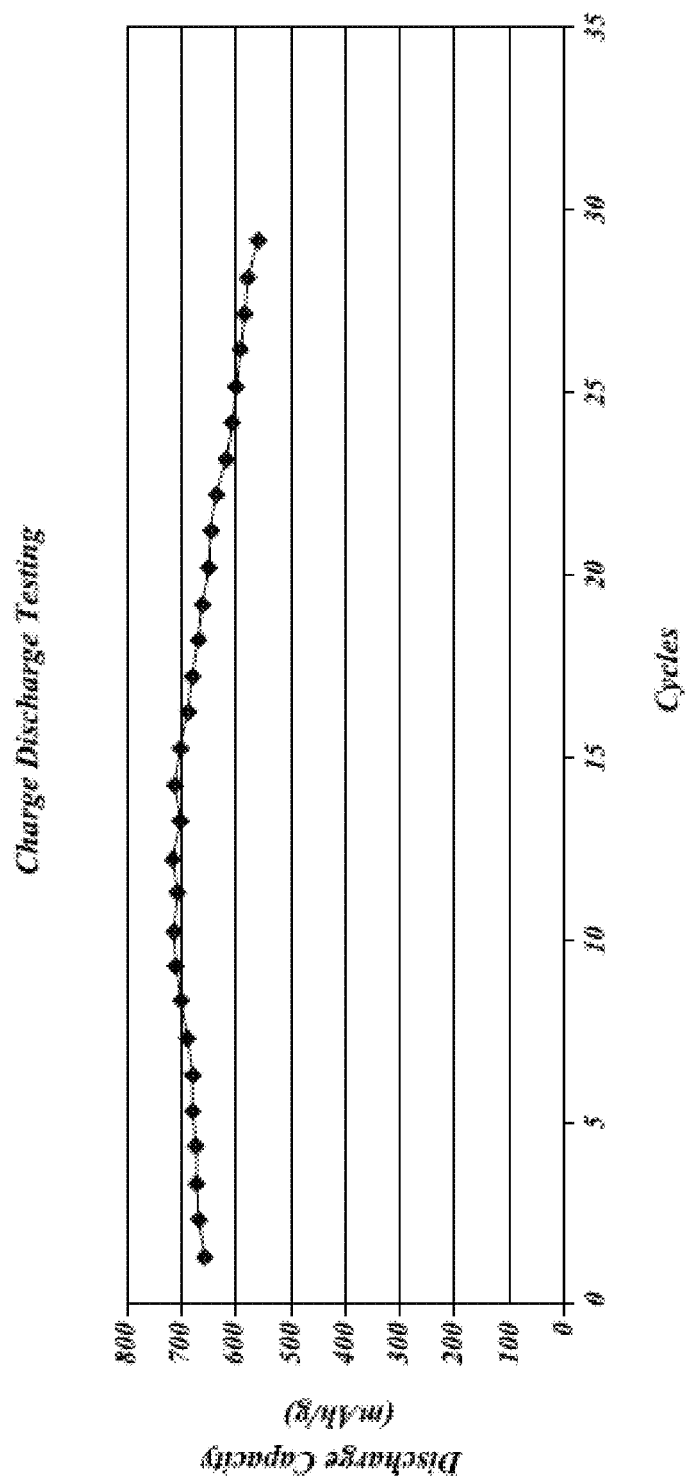
FIG. 7 is a plot of the discharge capacity at an average rate of C/5.

The resulting electrodes were then tested in a pouch cell configuration against a lithium NMC oxide cathode. A typical cycling graph is shown in FIG. 7.

Example 5

In Example 5, polyimide liquid precursor (PI 2611 from HD Microsystems corp.), and silicon microparticles (from Alfa Aesar corp.) were mixed together using a Turbula mixer for a duration of 1 hours in the weight ratio of 4:1. The mixture was then cast onto aluminum foil covered with a carbon veil (from Fibre Glast Developments Corporation) and allowed to dry in a 90° C. oven to drive away solvents, e.g., NMP. This was followed by a curing step at 200° C. in a hot press, under negligible pressure, for at least 12 hours. The aluminum foil backing was then removed by etching in a 12.5% HCl solution. The remaining film was then rinsed in DI water, dried and then pyrolyzed around an hour at 1175° C. under argon flow. The process resulted in a composition of approximately 23% of PI 2611 derived carbon, 76% of silicon by weight, and the weight of the veil being negligible.

Figure 8:
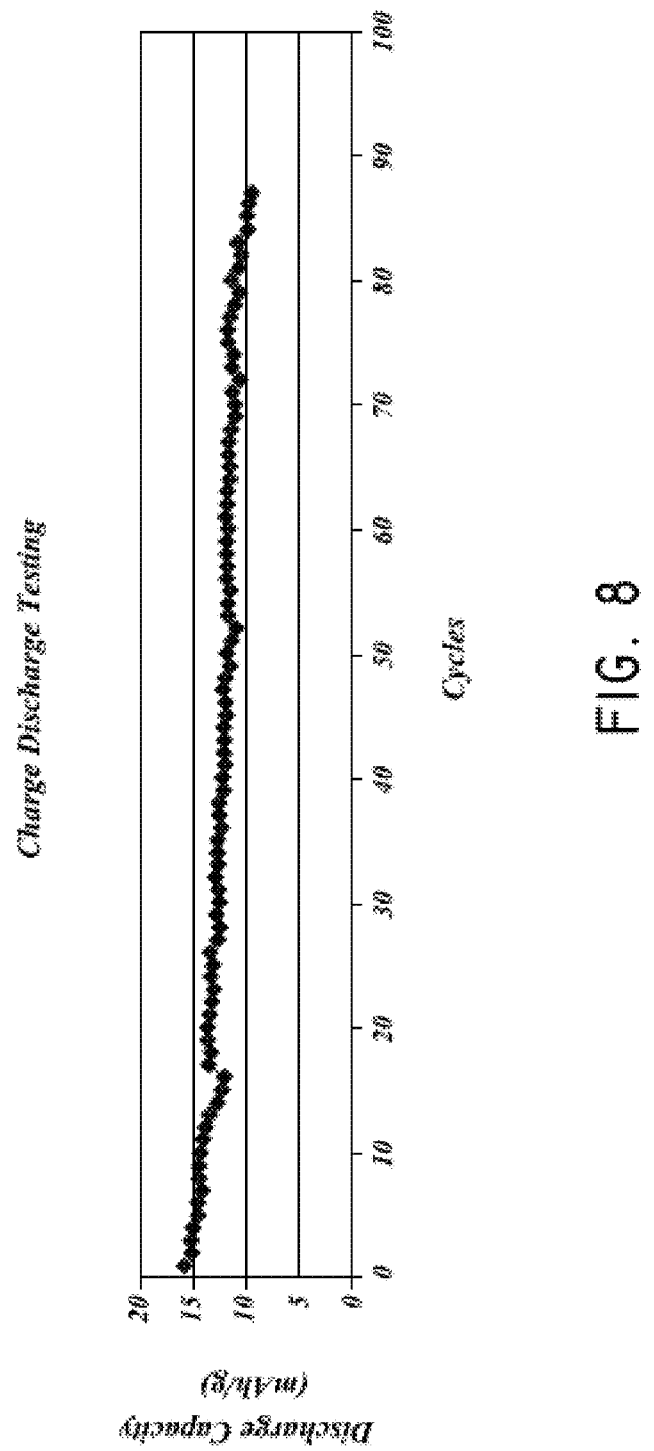
FIG. 8 is a plot of the discharge capacity at an average rate of C/9.

The resulting electrodes were then tested in a pouch cell configuration against a lithium nickel manganese cobalt oxide (NMC) cathode. A typical cycling graph is shown in FIG. 8.

Example 6

In Example 6, polyimide liquid precursor (PI 2611 from HD Microsystems corp.), graphite particles (SLP30 from Timcal corp.), and silicon microparticles (from Alfa Aesar corp.) were mixed together for 5 minutes using a Spex 8000D machine in the weight ratio of 200:10:70. The mixture was then cast onto aluminum foil and allowed to dry in a 90° C. oven, to drive away solvents (e.g., NMP). The dried mixture was cured at 200° C. in a hot press, under negligible pressure, for at least 12 hours. The aluminum foil backing was then removed by etching in a 12.5% HCl solution. The remaining film was then rinsed in DI water, dried and then pyrolyzed at 1175° C. for about one hour under argon flow. The process resulted in a composition of 15.8% of PI 2611 derived carbon, 10.5% of graphite particles, 73.7% of silicon by weight.

Figure 9:
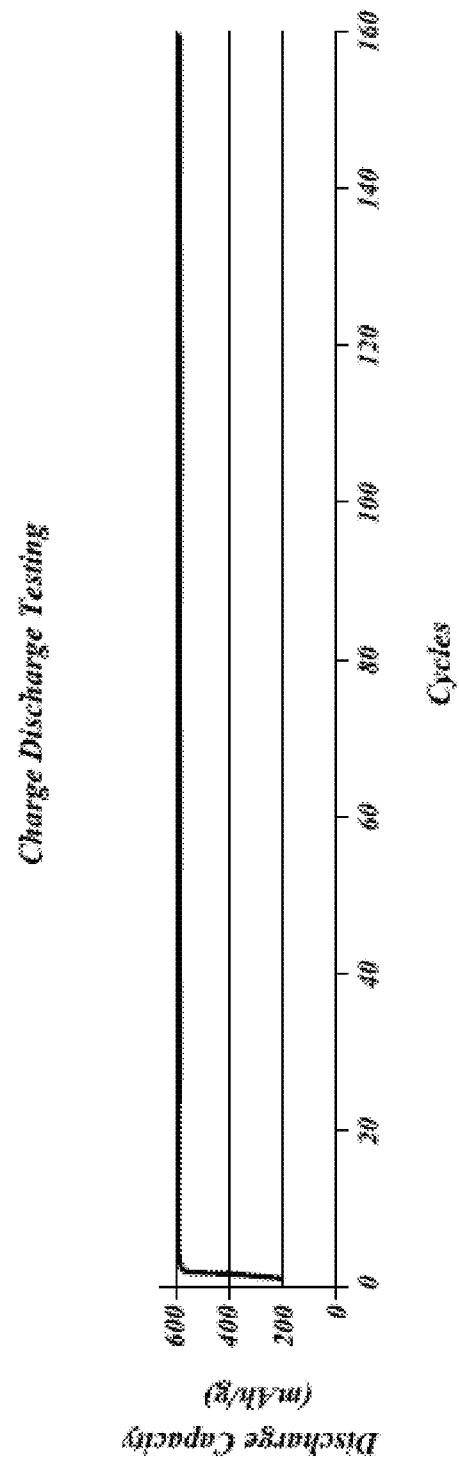
FIG. 9 is a plot of the discharge capacity.

The resulting electrodes were then tested in a pouch cell configuration against a lithium NMC oxide cathode. The anodes where charged to 600 mAh/g each cycle and the discharge capacity per cycle was recorded. A typical cycling graph is shown in FIG. 9.

Example 7

Figure 10:
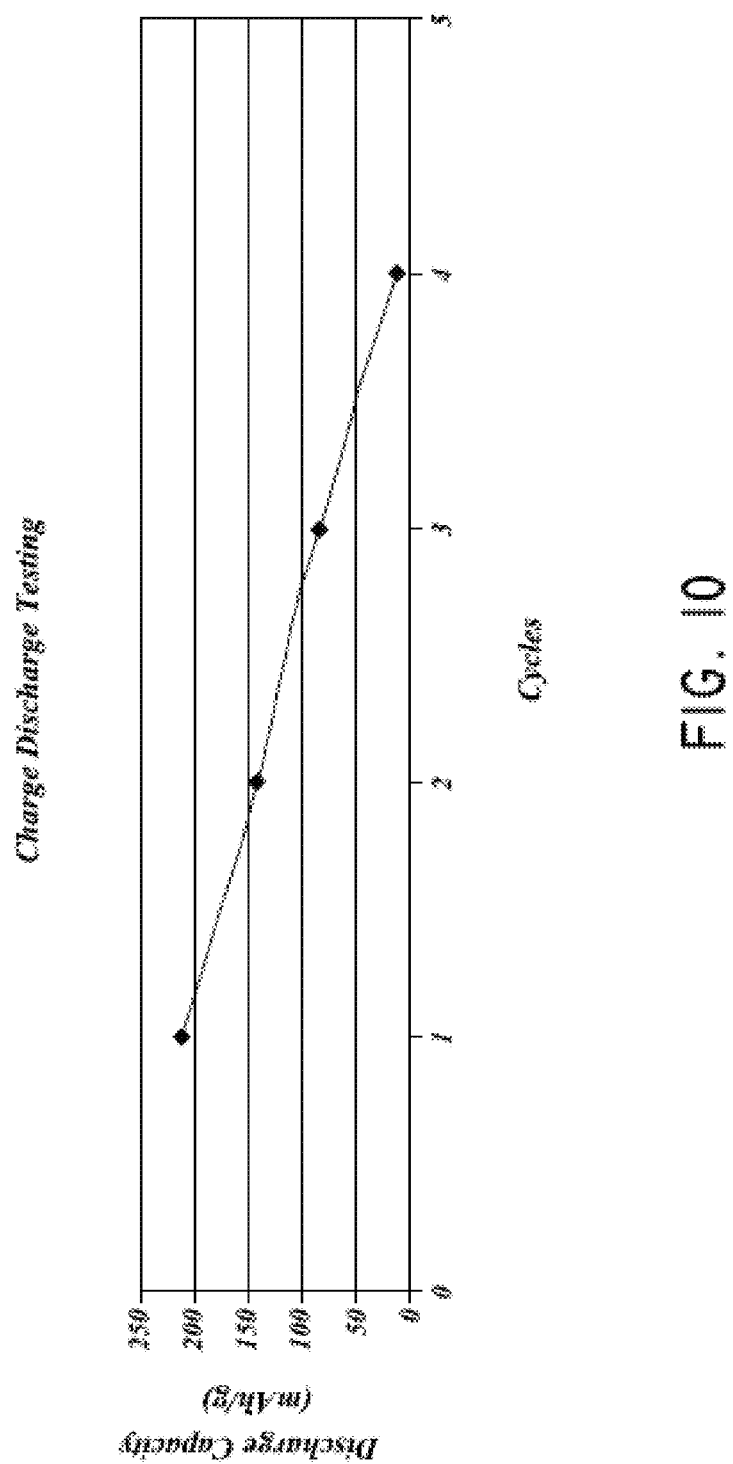
FIG. 10 is a plot of the discharge capacity at an average rate of C/9.

In Example 7, PVDF and silicon particles (from EVNANO Advanced Chemical Materials Co), conductive carbon particles (Super P from Timcal corp.), conductive graphite particles (KS6 from Timcal corp.), graphite particles (SLP30 from Timcal corp.) and NMP were mixed in the weight ratio of 5:20:1:4:70:95. The mixture was then cast on a copper substrate and then placed in a 90° C. oven to drive away solvents, e.g., NMP. The resulting electrodes were then tested in a pouch cell configuration against a lithium NMC Oxide cathode. A typical cycling graph is shown in FIG. 10.

Example 8

Multiple experiments were conducted in order to find the effects of varying the percentage of polyimide derive carbon (e.g. 2611c) while decreasing the percentage of graphite particles (SLP30 from Timcal corp.) and keeping the percentage of silicon microparticles (from Alfa Aesar corp.) at 20 wt. %.

Figure 11B:
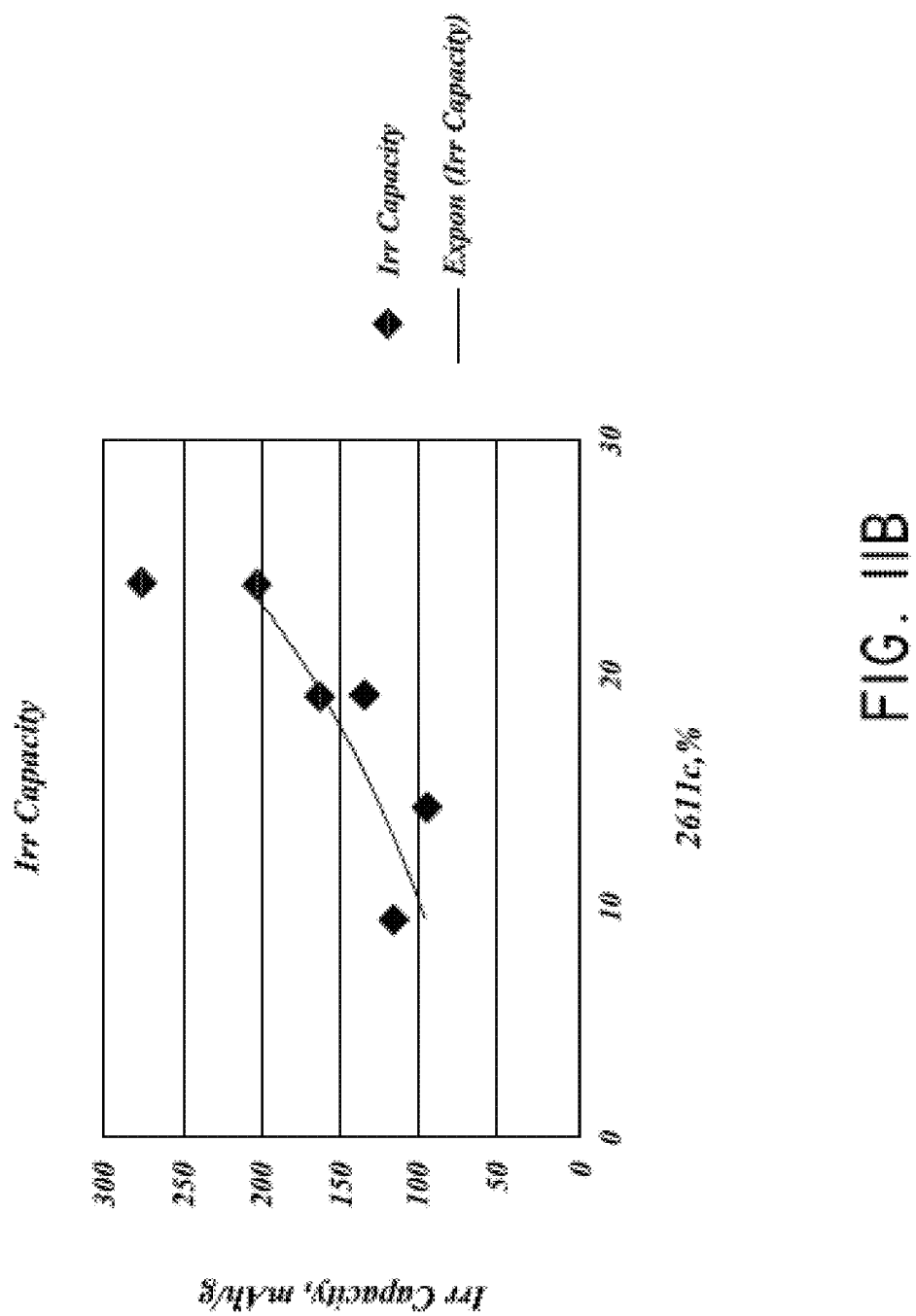

As shown in FIGS. 11A and 11B, the results show that more graphite and less 2611c was beneficial to cell performance by increasing the specific capacity while decreasing the irreversible capacity. Minimizing 2611c adversely affected the strength of the resultant anode so a value close to 20 wt. % can be preferable as a compromise in one embodiment.

Example 9

Figure 12:
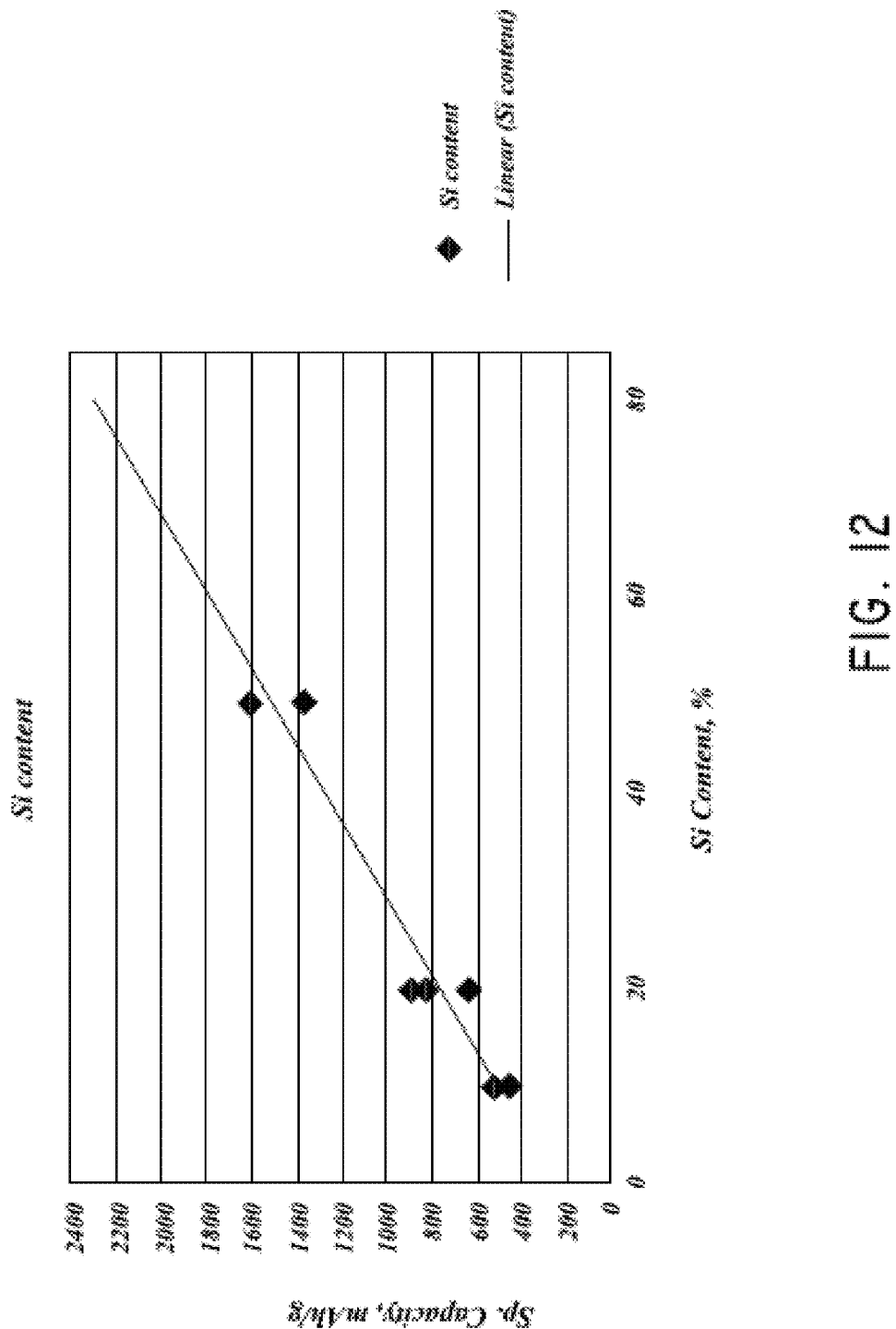
FIG. 12 is a plot of the first cycle discharge capacity as a function of weight percentage of carbon.

Similar to example 8, if 2611c is kept at 20 wt. % and Si percentage is increased at the expense of graphite particles, the first cycle discharge capacity of the resulting electrode is increased. FIG. 12 shows that a higher silicon content can make a better performing anode.

Example 10

Figure 13:
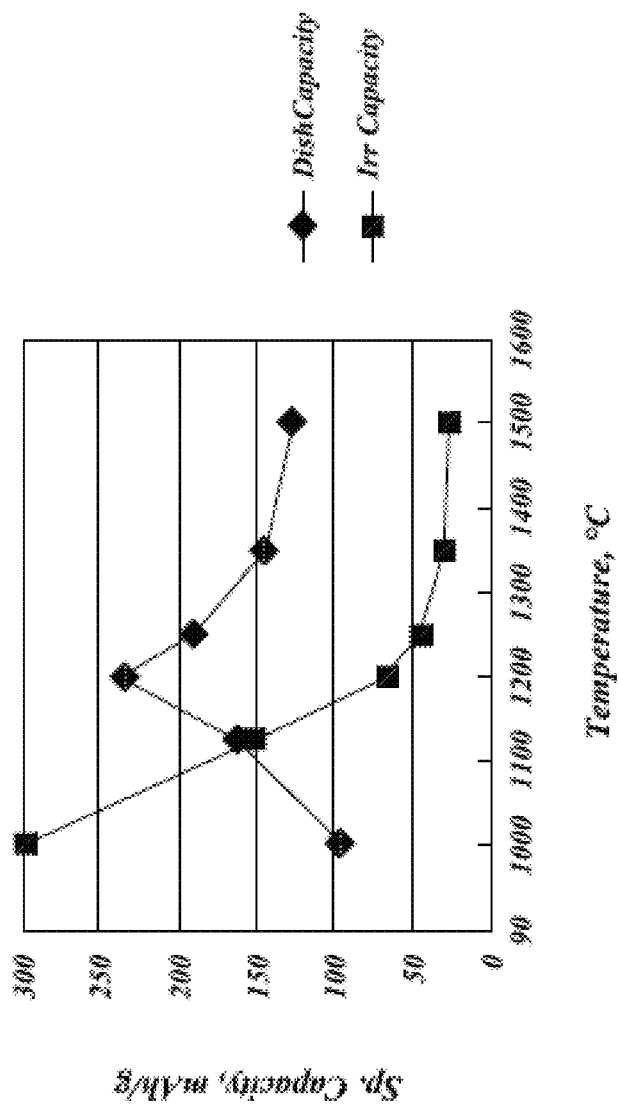
FIG. 13 is a plot of the reversible (discharge) and irreversible capacity as a function of pyrolysis temperature.

When 1 mil thick sheets of polyimide are pyrolized and tested in accordance with the procedure in Example 1. The reversible capacity and irreversible capacity were plotted as a function of the pyrolysis temperature. FIG. 13 indicates that, in one embodiment, it is preferable to pyrolyze polyimide sheets (Upilex by UBE corp) at around 1175° C.

Additional Examples

Figure 14:
FIG. 14 is a photograph of a 4.3 cm×4.3 cm composite anode film without a metal foil support layer.

FIG. 14 is a photograph of a 4.3 cm×4.3 cm composite anode film without a metal foil support layer. The composite anode film has a thickness of about 30 microns and has a composition of about 15.8% of PI 2611 derived carbon, about 10.5% of graphite particles, and about 73.7% of silicon by weight.

Figure 15:
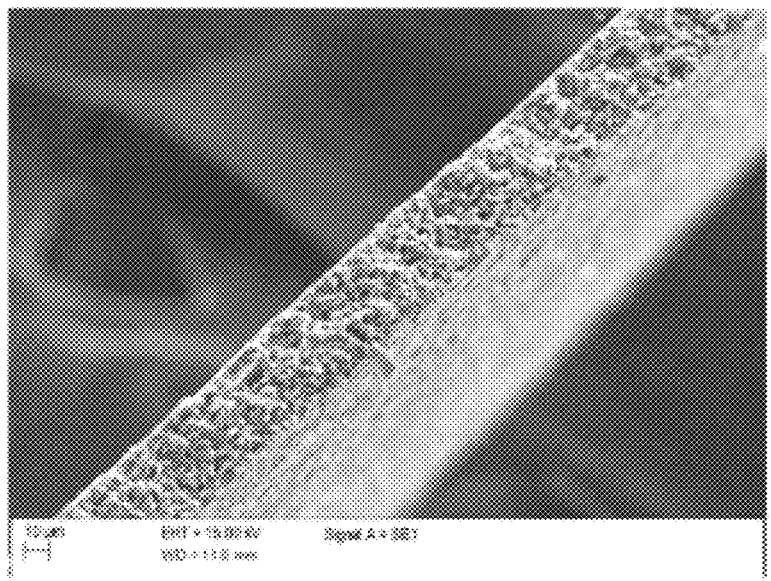
FIG. 15 is a scanning electron microscope (SEM) micrograph of a composite anode film before being cycled (the out-of-focus portion is a bottom portion of the anode and the portion that is in focus is a cleaved edge of the composite film)
Figure 16:
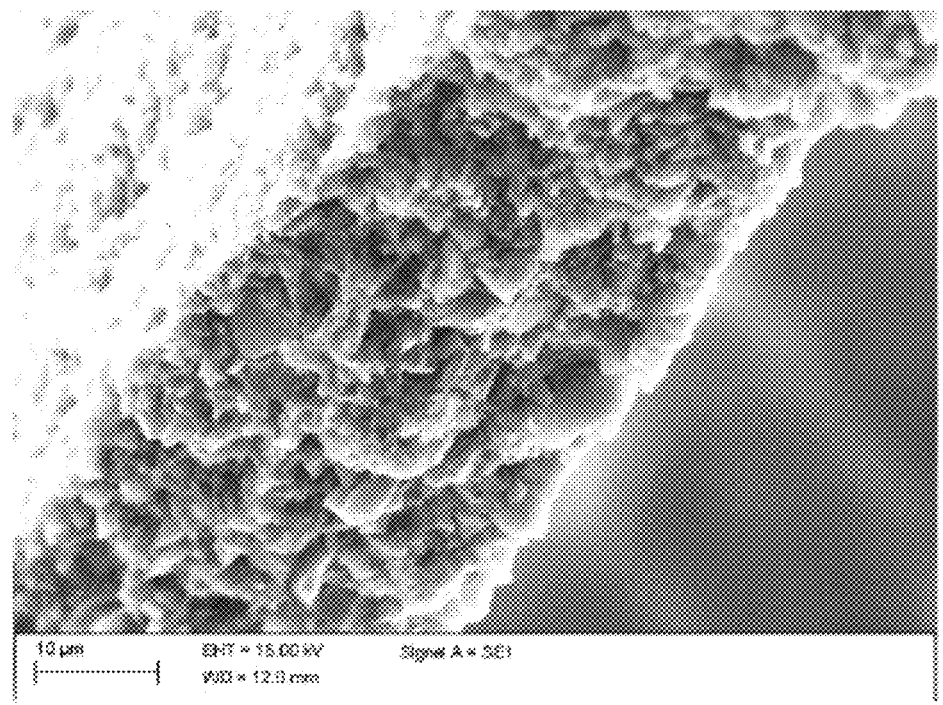
FIG. 16 is another SEM micrograph of a composite anode film before being cycled.
Figure 17:
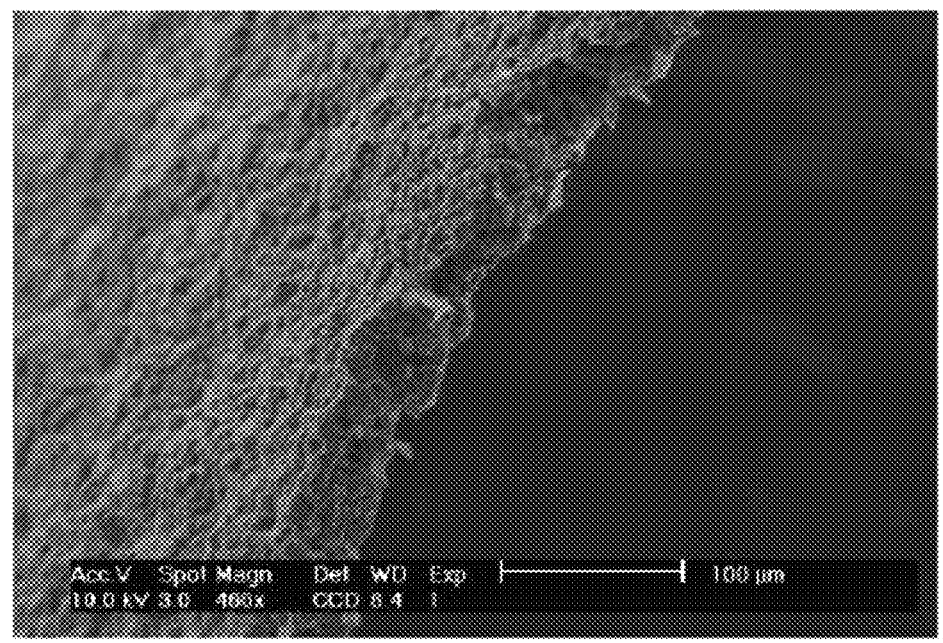
FIG. 17 is a SEM micrograph of a composite anode film after being cycled 10 cycles.
Figure 18:
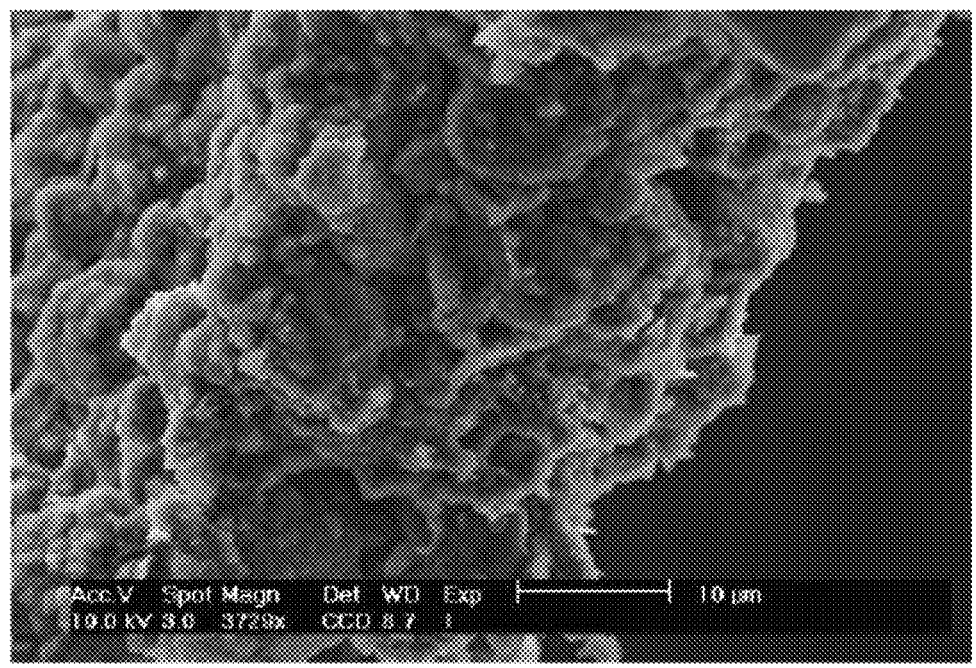
FIG. 18 is another SEM micrograph of a composite anode film after being cycled 10 cycles.
Figure 19:
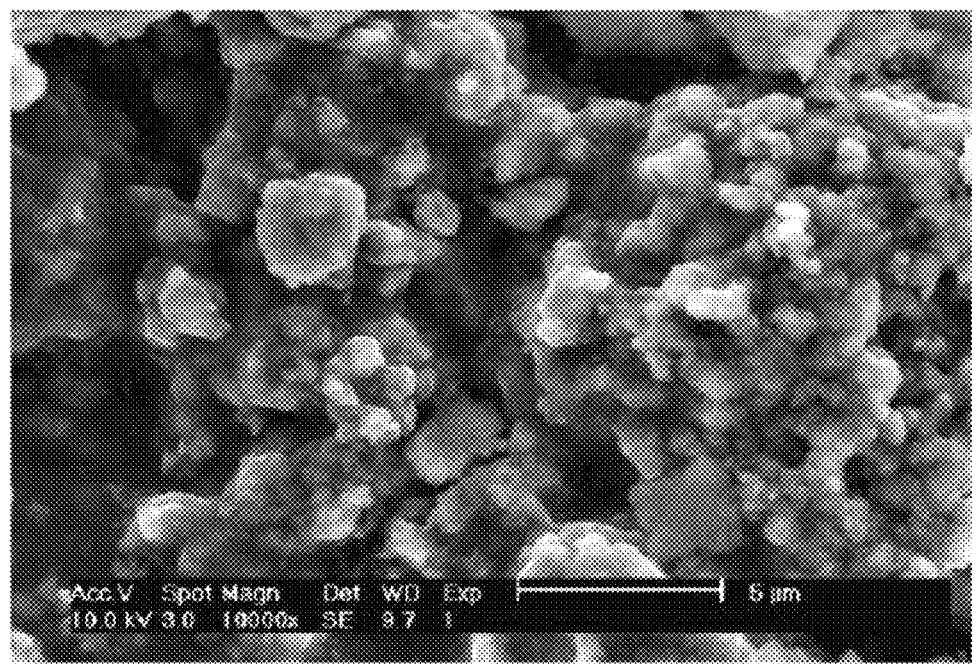
FIG. 19 is a SEM micrograph of a composite anode film after being cycled 300 cycles.
Figure 20:
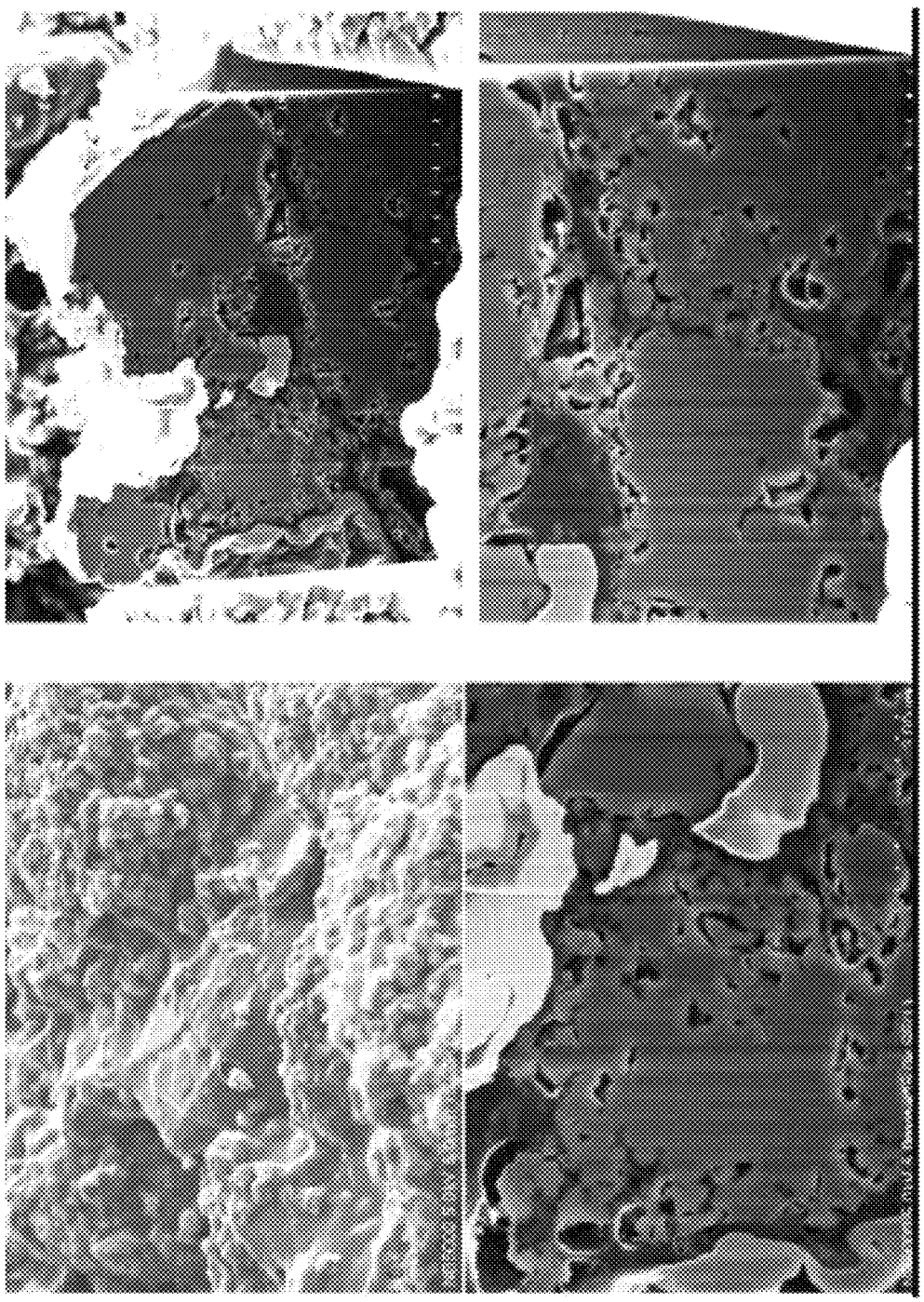
FIG. 20 includes SEM micrographs of cross-sections of composite anode films.

FIGS. 15-20 are scanning electron microscope (SEM) micrographs of a composite anode film. The compositions of the composite anode film were about 15.8% of PI 2611 derived carbon, about 10.5% of graphite particles, and about 73.7% of silicon by weight. FIGS. 15 and 16 show before being cycled (the out-of-focus portion is a bottom portion of the anode and the portion that is in focus is a cleaved edge of the composite film). FIGS. 17, 18, and 19 are SEM micrographs of a composite anode film after being cycled 10 cycles, 10 cycles, and 300 cycles, respectively. The SEM micrographs show that there is not any significant pulverization of the silicon and that the anodes do not have an excessive layer of solid electrolyte interface/interphase (SEI) built on top of them after cycling. FIG. 20 are SEM micrographs of cross-sections of composite anode films.

Described below are measured properties of example silicon particles. These examples are discussed for illustrative purposes and should not be construed to limit the scope of the disclosed embodiments.

Figure 21:
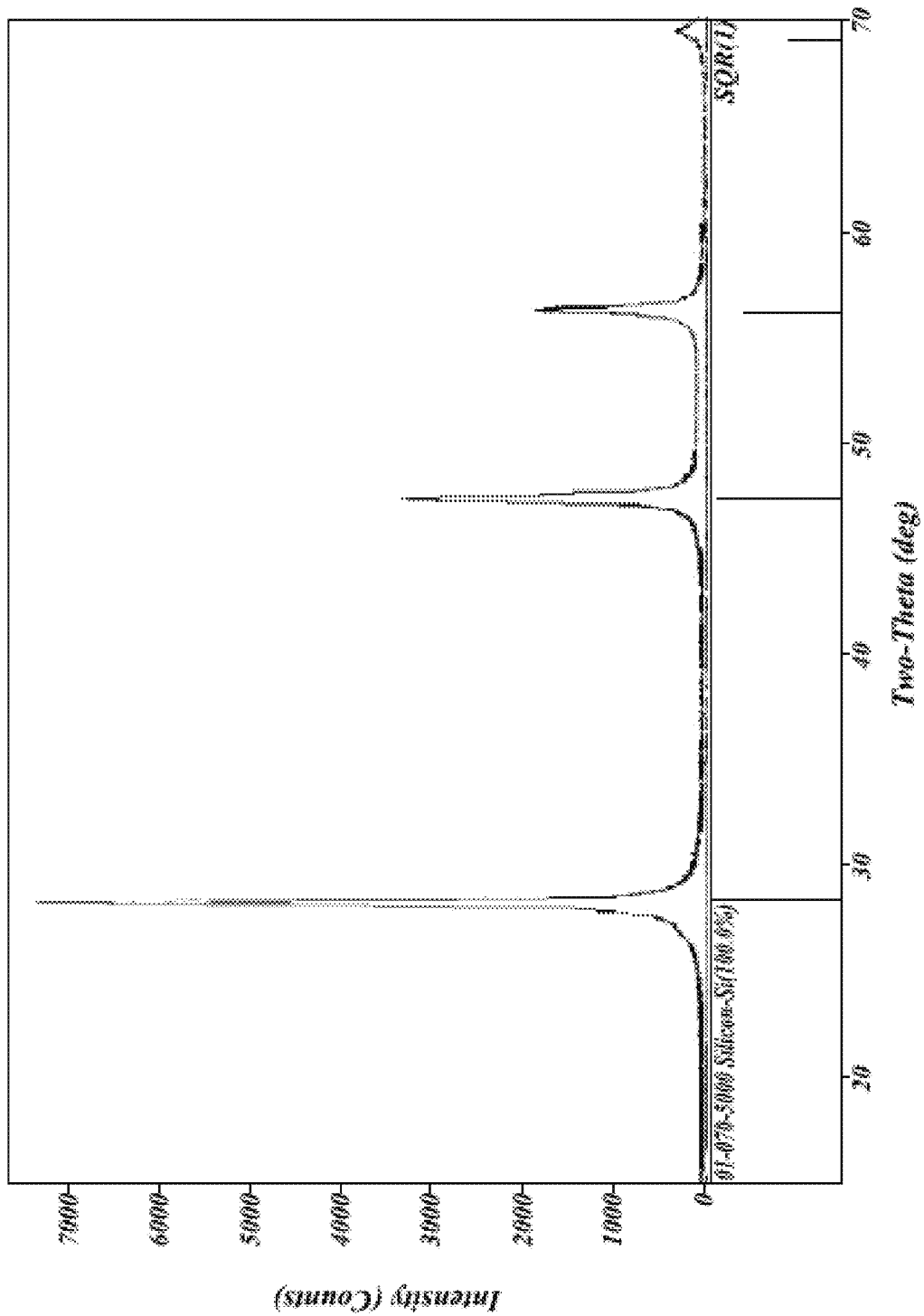
FIG. 21 is an x-ray powder diffraction (XRD) graph of the sample silicon particles.
Figure 22:
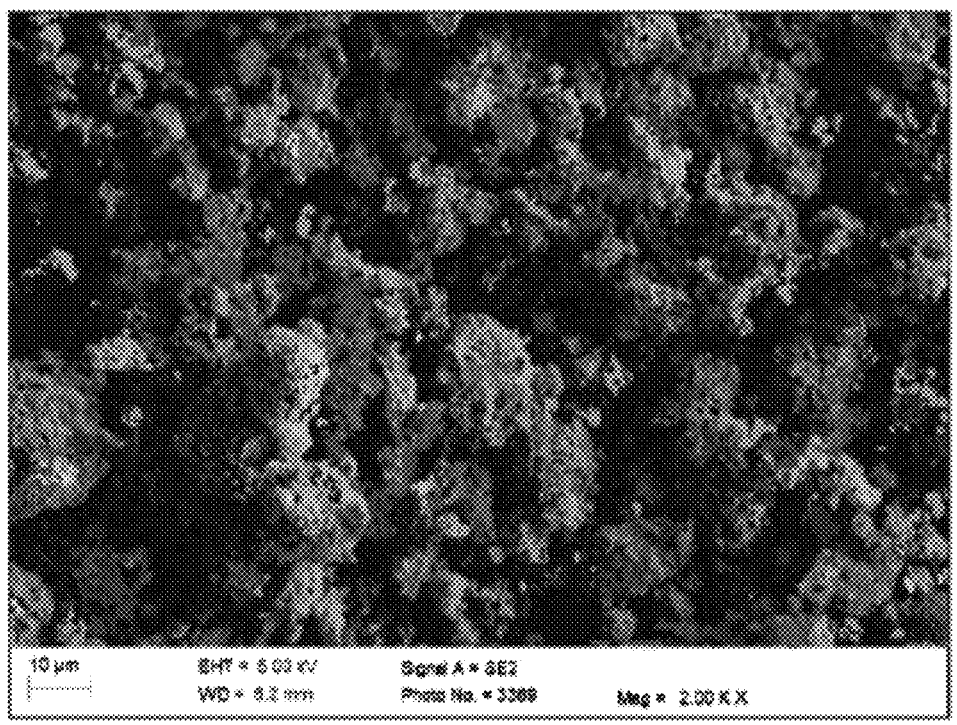
FIG. 22 is a SEM micrograph of one embodiment of silicon particles.
Figure 23:
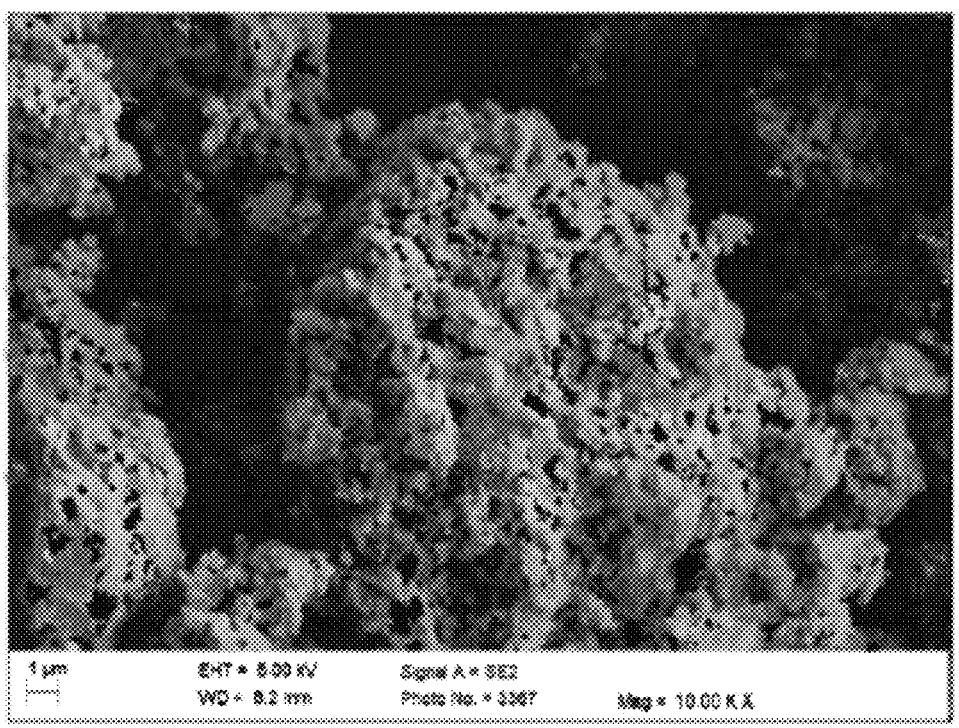
FIG. 23 is another SEM micrographs of one embodiment of silicon particles.
Figure 24:
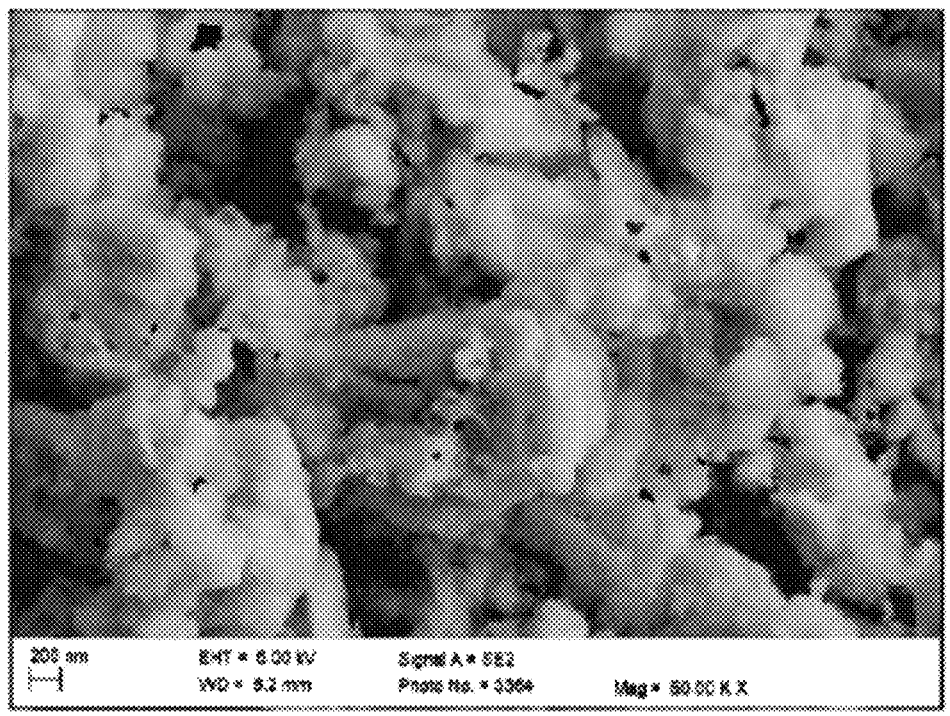
FIG. 24 is a SEM micrograph of one embodiment of silicon particles.
Figure 25:
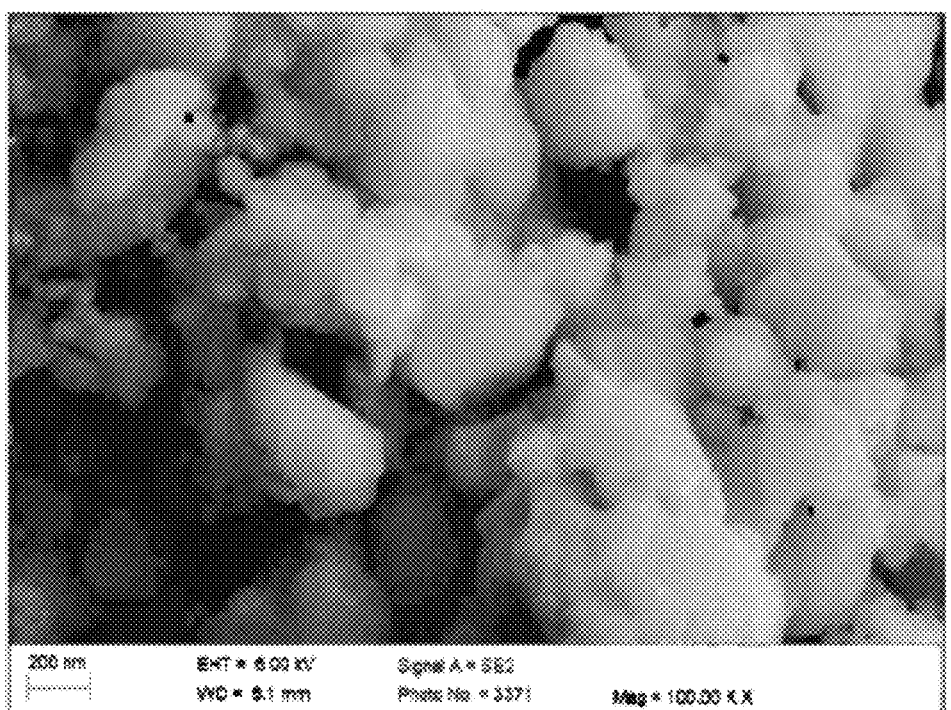
FIG. 25 is a SEM micrograph of one embodiment of silicon particles.

FIG. 21 is an x-ray powder diffraction (XRD) graph of the sample silicon particles. The XRD graph suggests that the sample silicon particles were substantially crystalline or polycrystalline in nature.

FIGS. 22-25 are scanning electron microscope (SEM) micrographs of the sample silicon particles. Although the SEM micrographs appear to show that the silicon particles may have an average particle size greater than the measured average particle size of about 300 nm, without being bound by theory, the particles are believed to have conglomerated together to appear to be larger particles.

FIG. 26 is a chemical analysis of the sample silicon particles. The chemical analysis suggests that the silicon particles were substantially pure silicon.

Figure 27A:
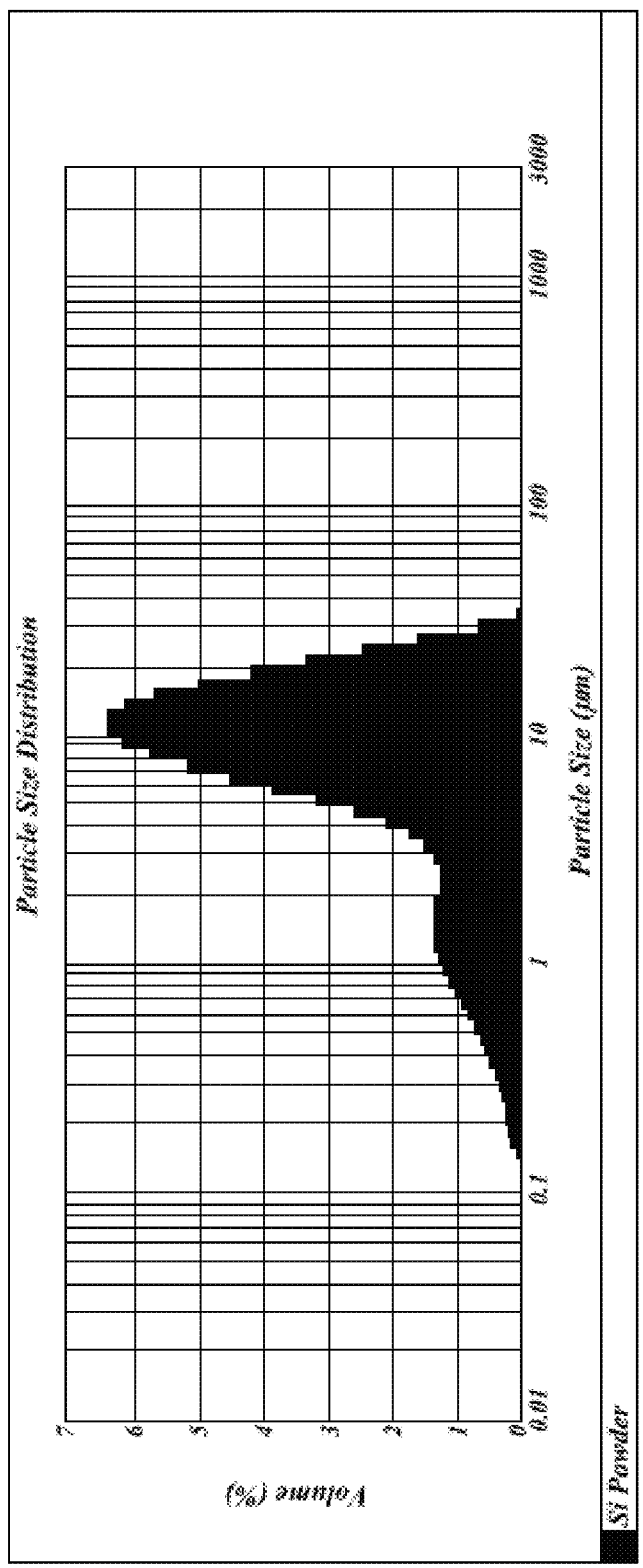
FIGS. 27A and 27B are example particle size histograms of two micron-sized silicon particles with nanometer-sized features.
Figure 27B:
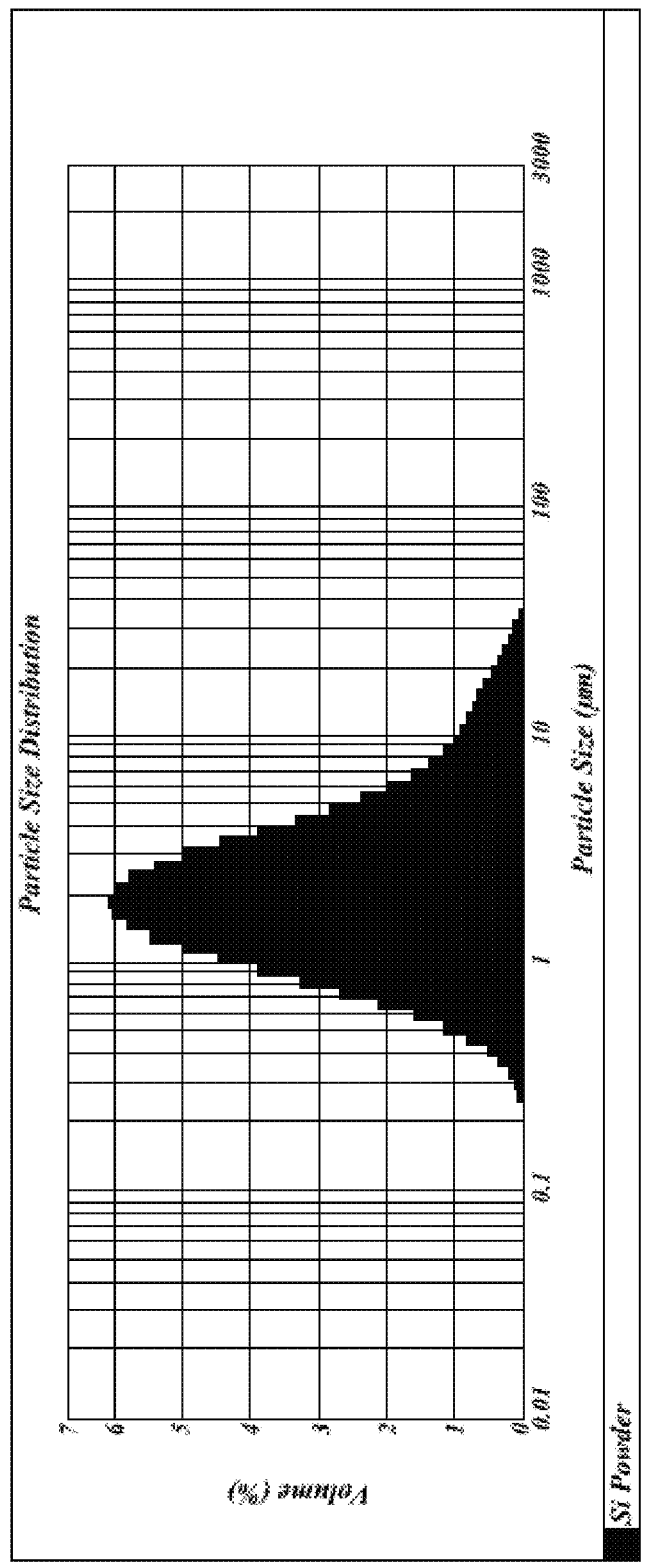

FIGS. 27A and 27B are example particle size histograms of two micron-sized silicon particles with nanometer-sized features. The particles were prepared from a FBR process. Example silicon particles can have a particle size distribution. For example, at least 90% of the particles may have a particle size, for example, a diameter or a largest dimension, between about 5 μm and about 20 μm (e.g., between about 6 μm and about 19 μm). At least about 50% of the particles may have a particle size between about 1 μm and about 10 μm (e.g., about 2 μm and about 9 μm). Furthermore, at least about 10% of the particles may have a particle size between about 0.5 μm and about 2 μm (e.g., about 0.9 μm and about 1.1 μm).

Figure 28:
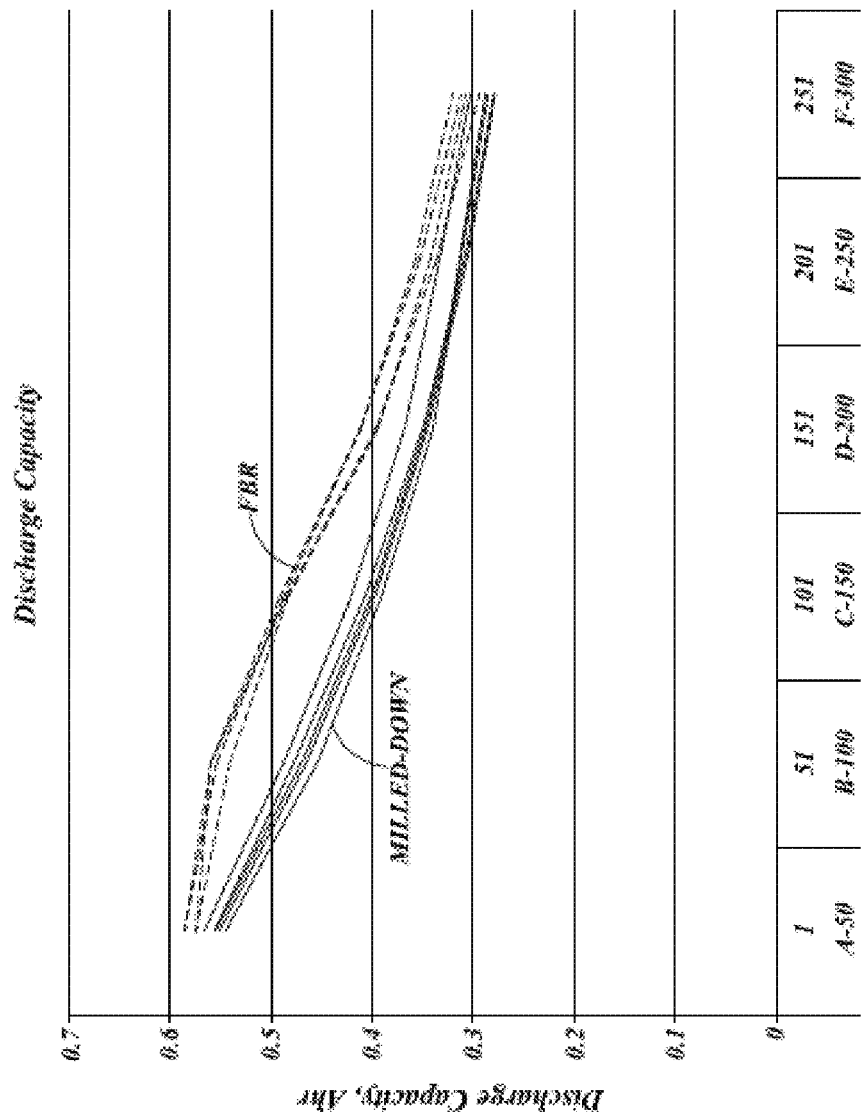
FIG. 28 is a plot of discharge capacity during cell cycling comparing two types of example silicon particles.

FIG. 28 is a plot of discharge capacity during cell cycling comparing two types of example silicon particles. The performance of four samples of silicon particles (micron-sized particles with nanometer-sized features) prepared by the FBR process are compared with five samples of silicon particles prepared by milling-down larger silicon particles. Thus, certain embodiments of silicon particles with the combined micron/nanometer geometry (e.g., prepared by the FBR process) can have enhanced performance over various other embodiments of silicon particles (e.g., micron-sized silicon particles prepared by milling down from larger particles). The type of silicon particles to use can be tailored for the intended or desired application and specifications.

Examples of Moisture Treated Silicon Particles

Figure 29:
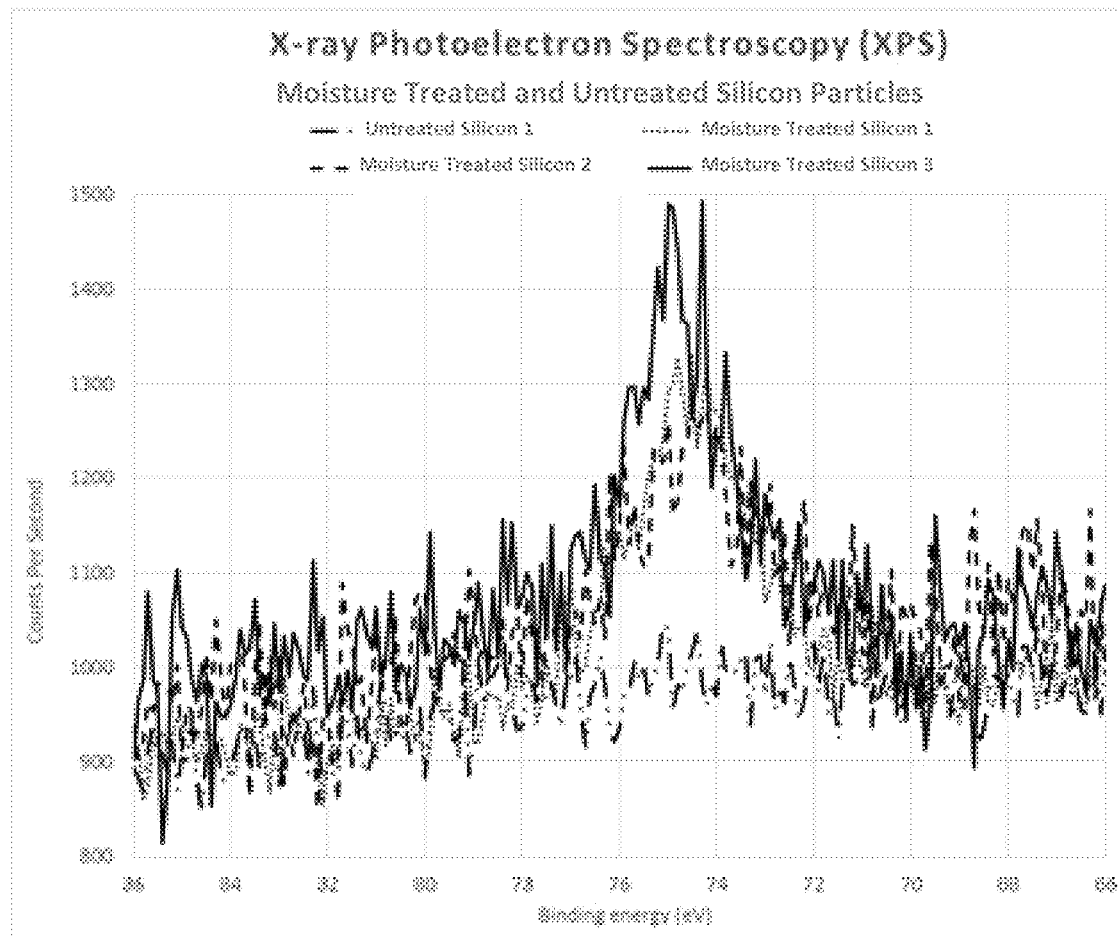
FIG. 29 shows X-ray Photoelectron Spectroscopy (XPS) spectra of the aluminum 2p peak in example moisture treated silicon particles compared with untreated silicon particles.

Silicon powders were immersed into de-ionized water with a 1:4 weight ratio. The mixture was stirred thoroughly and dried at 160° C. for 24 hours. FIG. 29 shows X-ray Photoelectron Spectroscopy (XPS) spectra of the aluminum 2p peak in example moisture treated silicon particles compared with untreated silicon particles. As shown in FIG. 29, moisture treated silicon particles have a characteristic aluminum peak, indicating presence of aluminum at the surface. Aluminum oxide and/or aluminum silicide were present in quantities greater than 0.001% (e.g., greater than 0.01%, greater than 0.1%, etc.) in the outer regions (e.g., about 20 nm depth) of the silicon particles. Without being bound by theory, moisture treatment can allow more aluminum at the surface.

Table I includes contact angle (CA) measurements for the different samples of the example moisture treated silicon particles. The contact angles (CA) were measured by the Washburn method using a force tensiometer.

TABLE 1

|  | Sample 1 | Sample 2 |
| --- | --- | --- |
| CA - Measurement 1 | 87.072 | 84.821 |
| CA - Measurement 2 | 82.909 | 82.646 |
| CA - Measurement 3 | 84.294 | 85.104 |
| CA - Average | 84.758 | 84.190 |
| CA - Standard Deviation | 2.120 | 1.345 |

As shown in Table 1, the average contact angle for the samples was 84.19° and 84.76°. The contact angles measured before moisture treatment were higher (e.g., greater than) 87.2° than after treatment.

The samples described herein were mixed with graphite, NMP, and resin. The mixture was formed into an anode precursor (e.g., coated on a substrate, dried, and removed from the substrate), and pyrolysed to form a self-supporting anode film as described herein.

Figure 30:
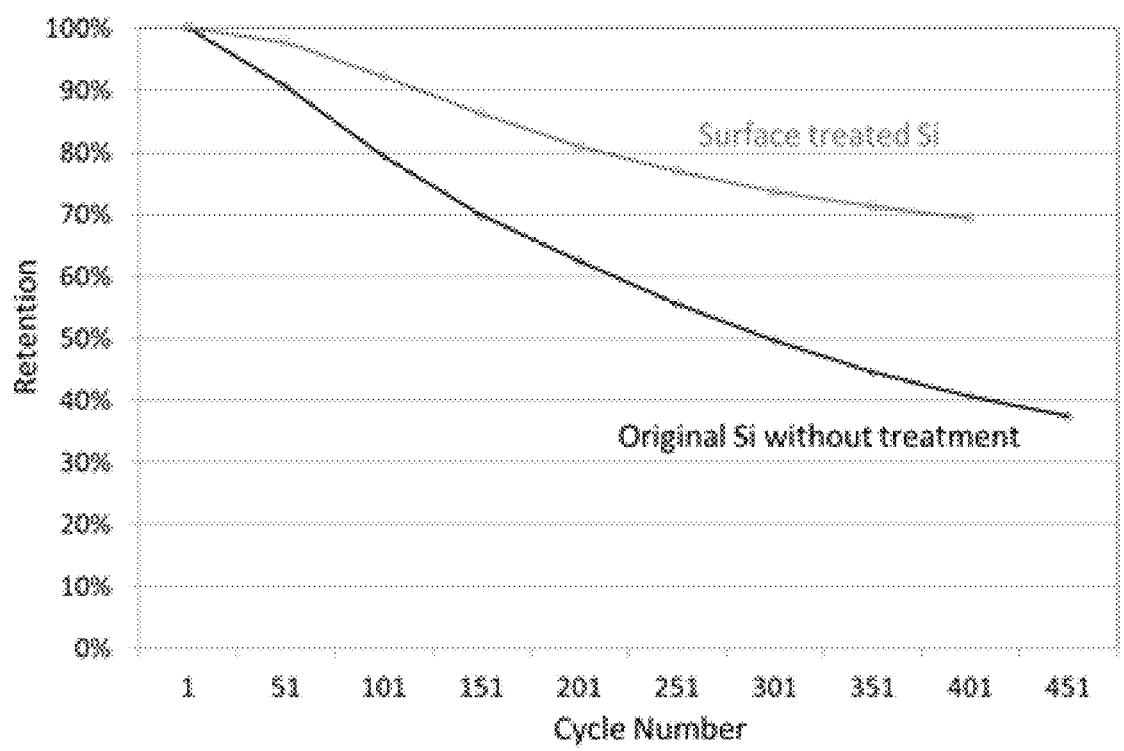
FIG. 30 shows a graph of capacity retention versus cycle number for a battery comprising moisture treated silicon particles compared with a battery comprising untreated silicon particles.

The sample anodes were built against lithium cobalt oxide (LCO)-based cathodes to form a battery. FIG. 30 shows a graph of the capacity retention versus cycle number for the sample batteries. As shown in FIG. 30, the capacity retention of the battery with moisture treated silicon particles improved by 30% at 400 cycles compared to the battery with untreated silicon particles.

As described herein, moisture treatment of silicon particles can provide a relatively simple and practical method to control the SEI formation in electrodes and to significantly improve electrochemical cell performance. Moisture treatment can also provide a method to reduce cell-to-cell variation in performance, which can allow the product to be more stable and less dependent on process variations. Further, moisture treatment of silicon particles can provide a method to control the initial lithiation level in the active particles, which can allow a more even lithiation and stress and reduce localized and concentrated reactions that may accelerate fading. Moreover, although various embodiments described herein include silicon particles for use in lithium-ion batteries, the silicon particles can be used in other battery systems involving silicon-metal alloying processes, e.g., sodium or magnesium systems.

Various embodiments have been described above. Although the invention has been described with reference to these specific embodiments, the descriptions are intended to be illustrative and are not intended to be limiting. Various modifications and applications may occur to those skilled in the art without departing from the true spirit and scope of the invention as defined in the appended claims.

What is claimed is:

1. A method comprising:
   forming a mixture comprising a liquid and a silicon material, wherein a silicon particle of the silicon material comprises an outer region with a first concentration of aluminum; and
   drying the mixture to form a treated silicon material in which the outer region of the silicon particle has a second concentration of aluminum that differs from the first concentration of aluminum.

2. The method of claim 1, wherein the liquid is water, de-ionized water, distilled water, purified water, ultrapure water, or alcohol.

3. The method of claim 1, wherein the silicon material comprises silicon powder, silicon fibers, porous silicon, or ball-milled silicon.

4. The method of claim 1, wherein forming the mixture comprises immersing the silicon material in the liquid such that a weight ratio between the silicon material and the liquid is from about 1:1 to about 1:6.

5. The method of claim 1, wherein forming the mixture comprises:
   immersing the silicon material in the liquid; and
   stirring the mixture such that surfaces of the silicon material are wetted with the liquid.

6. The method of claim 1, wherein drying comprises drying the mixture at temperatures between about 140° C. and about 180° C.

7. The method of claim 1, wherein drying comprises drying the mixture for at least 20 hours.

8. The method of claim 1, wherein:
   the silicon particle comprises an inner region and the outer region that extends from a surface of the silicon particle to the inner region; and
   wherein, after the drying, a concentration of aluminum in the outer region is greater than a concentration of aluminum in the inner region.

9. The method of claim 1, comprising
   combining the treated silicon material with a binder to form a slurry;
   applying the slurry to a current collector; and
   pyrolyzing the slurry to form a first electrode comprising active material layer on the current collector.

10. The method of claim 9, comprising forming a battery cell comprising the first electrode, a second electrode, a separator between the first electrode and the second electrode, and an electrolyte.

11. A method comprising:
    forming a mixture comprising an oxidizing agent and a silicon material, wherein a silicon particle of the silicon material comprises an outer region with a first concentration of aluminum; and
    drying the mixture to form a treated silicon material in which the outer region of the silicon particle has a second concentration of aluminum that differs from the first concentration of aluminum.

12. The method of claim 11, wherein the oxidizing agent comprises potassium hydroxide or hydrogen peroxide.

13. The method of claim 11, wherein the silicon material comprises silicon powder, silicon fibers, porous silicon, or ball-milled silicon.

14. The method of claim 11, wherein forming the mixture comprises immersing the silicon material in the oxidizing agent such that a weight ratio between the silicon material and the oxidizing agent is from about 1:1 to about 1:6.

15. The method of claim 11, wherein forming the mixture comprises:
    immersing the silicon material in the oxidizing agent; and
    stirring the mixture such that surfaces of the silicon material are wetted with the oxidizing agent.

16. The method of claim 11, wherein drying comprises drying the mixture at temperatures between about 140° C. and about 180° C.

17. The method of claim 11, wherein drying comprises drying the mixture for at least 20 hours.

18. The method of claim 11, wherein:
    the silicon particle comprises an inner region and the outer region that extends from a surface of the silicon particle to the inner region; and
    wherein, after the drying, a concentration of aluminum in the outer region is greater than a concentration of aluminum in the inner region.

19. The method of claim 11, comprising
    combining the treated silicon material with a binder to form a slurry;
    applying the slurry to a current collector; and
    pyrolyzing the slurry to form a first electrode comprising active material layer on the current collector.

20. The method of claim 19, comprising forming a battery cell comprising the first electrode, a second electrode, a separator between the first electrode and the second electrode, and an electrolyte.

* * * * *